(12) United States Patent
Jiang et al.

(10) Patent No.: US 12,468,430 B2
(45) Date of Patent: *Nov. 11, 2025

(54) DISPLAYING INTERFACES IN DIFFERENT DISPLAY AREAS BASED ON ACTIVITIES

(71) Applicant: Huawei Technologies Co., Ltd., Shenzhen (CN)

(72) Inventors: Xiuping Jiang, Wuhan (CN); Jie Fang, Shenzhen (CN); Bo Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,442

(22) Filed: Nov. 11, 2022

(65) Prior Publication Data

US 2023/0115868 A1    Apr. 13, 2023

Related U.S. Application Data

(63) Continuation of application No. 17/296,841, filed as application No. PCT/CN2019/119574 on Nov. 20, 2019, now Pat. No. 11,567,623.

(30) Foreign Application Priority Data

Nov. 26, 2018 (CN) .......................... 201811420187.5

(51) Int. Cl.
*G06F 3/0481* (2022.01)
*G06F 1/16* (2006.01)
(Continued)

(52) U.S. Cl.
CPC .......... *G06F 3/0481* (2013.01); *G06F 1/1613* (2013.01); *G06F 3/04886* (2013.01);
(Continued)

(58) Field of Classification Search
None
See application file for complete search history.

(56) References Cited

U.S. PATENT DOCUMENTS 6,871,188 B2   3/2005   De Souza
7,234,155 B1   6/2007   Kay et al.
(Continued)

FOREIGN PATENT DOCUMENTS

CN   102184075 A   9/2011
CN   103581754 A   2/2014
(Continued)

OTHER PUBLICATIONS

SAP, "Split-Screen Layout," sap.m.SplitApp, SAPUI5 Version 1.32, Feb. 17, 2017, 14 pages.
(Continued)

*Primary Examiner* — Henry Orr
(74) *Attorney, Agent, or Firm* — Conley Rose, P.C.

(57) ABSTRACT

An electronic device includes a first application. The electronic device detects a first operation. The electronic device displays, in a landscape orientation state, a first interface of the first application in a first area of a display screen of the electronic device in response to the first operation. The electronic device detects a second operation on the first interface, where the second operation enables the electronic device to open a second interface of the first application. The electronic device displays the second interface in a second area in response to the second operation. The display screen includes at least two areas, the at least two areas include the first area and the second area, and different areas of the display screen do not overlap.

26 Claims, 24 Drawing Sheets

(51) Int. Cl.
  *G06F 3/04886* (2022.01)
  *G06Q 30/0601* (2023.01)

(52) U.S. Cl.
  CPC ..... *G06Q 30/0633* (2013.01); *G06Q 30/0643* (2013.01); *G06F 2200/1637* (2013.01); *G06F 2203/04803* (2013.01)

(56) References Cited

U.S. PATENT DOCUMENTS

| | | |
|---|---|---|
| 7,596,761 B2 | 9/2009 | Lemay et al. |
| 8,712,477 B2 | 4/2014 | Yu et al. |
| 8,793,606 B2 | 7/2014 | Kim |
| 9,354,788 B2 | 5/2016 | Woo et al. |
| 9,436,352 B2 | 9/2016 | Eim et al. |
| 9,489,078 B2 | 11/2016 | Seo et al. |
| 9,852,761 B2 | 12/2017 | Anzures |
| 9,933,937 B2 | 4/2018 | Lemay et al. |
| 10,585,553 B2 | 3/2020 | Kim et al. |
| 2004/0098747 A1 | 5/2004 | Kay et al. |
| 2006/0224951 A1* | 10/2006 | Burke .................. G06F 16/957 707/E17.119 |
| 2008/0319852 A1 | 12/2008 | Gardner et al. |
| 2009/0172598 A1 | 7/2009 | Yamanaka et al. |
| 2010/0088634 A1 | 4/2010 | Tsuruta et al. |
| 2010/0248788 A1 | 9/2010 | Yook et al. |
| 2012/0054673 A1 | 3/2012 | Kim et al. |
| 2012/0117451 A1* | 5/2012 | You ....................... G06F 16/957 715/205 |
| 2012/0242702 A1 | 9/2012 | Sirpal et al. |
| 2013/0111405 A1 | 5/2013 | Park |
| 2013/0187861 A1 | 7/2013 | Lavalle |
| 2013/0222321 A1 | 8/2013 | Buening |
| 2013/0263042 A1 | 10/2013 | Buening |
| 2013/0268847 A1 | 10/2013 | Kim et al. |
| 2013/0321340 A1 | 12/2013 | Seo et al. |
| 2014/0149927 A1 | 5/2014 | Yoon |
| 2014/0218321 A1 | 8/2014 | Lee et al. |
| 2014/0351748 A1 | 11/2014 | Xia et al. |
| 2015/0113455 A1 | 4/2015 | Kang et al. |
| 2015/0169216 A1 | 6/2015 | Cho |
| 2015/0378557 A1 | 12/2015 | Jeong et al. |
| 2016/0034157 A1 | 2/2016 | Vranjes et al. |
| 2016/0086248 A1 | 3/2016 | Ohara |
| 2016/0103569 A1 | 4/2016 | Zatalovski |
| 2016/0249006 A1 | 8/2016 | Park et al. |
| 2016/0291920 A1 | 10/2016 | Sirpal et al. |
| 2017/0109011 A1 | 4/2017 | Jiang |
| 2017/0153809 A1 | 6/2017 | Yang et al. |
| 2017/0185248 A1 | 6/2017 | Lee et al. |
| 2017/0221109 A1 | 8/2017 | Liu et al. |
| 2017/0329483 A1 | 11/2017 | Jann et al. |
| 2017/0357437 A1* | 12/2017 | Peterson ............... G06F 40/134 |
| 2019/0187893 A1 | 6/2019 | Gan et al. |
| 2019/0205022 A1 | 7/2019 | Sun et al. |
| 2019/0286683 A1 | 9/2019 | Kittur et al. |
| 2019/0347128 A1 | 11/2019 | Han et al. |
| 2020/0371685 A1 | 11/2020 | Wang |

FOREIGN PATENT DOCUMENTS

| | | |
|---|---|---|
| CN | 103744669 A | 4/2014 |
| CN | 104123498 A | 10/2014 |
| CN | 104182686 A | 12/2014 |
| CN | 104461242 A | 3/2015 |
| CN | 104750450 A | 7/2015 |
| CN | 105353936 A | 2/2016 |
| CN | 105446755 A | 3/2016 |
| CN | 105573595 A | 5/2016 |
| CN | 105573755 A | 5/2016 |
| CN | 105988759 A | 10/2016 |
| CN | 106201409 A | 12/2016 |
| CN | 106293584 A | 1/2017 |
| CN | 106445514 A | 2/2017 |
| CN | 106648341 A | 5/2017 |
| CN | 106708367 A | 5/2017 |
| CN | 106778248 A | 5/2017 |
| CN | 106886413 A | 6/2017 |
| CN | 106940616 A | 7/2017 |
| CN | 106940621 A | 7/2017 |
| CN | 107102806 A | 8/2017 |
| CN | 107274272 A | 10/2017 |
| CN | 107491258 A | 12/2017 |
| CN | 107508990 A | 12/2017 |
| CN | 107832113 A | 3/2018 |
| CN | 108027706 A | 5/2018 |
| CN | 108415751 A | 8/2018 |
| CN | 108509110 A | 9/2018 |
| CN | 108595100 A | 9/2018 |
| CN | 108701001 A | 10/2018 |
| CN | 109814766 A | 5/2019 |
| CN | 108700999 B | 10/2020 |
| EP | 2523089 A2 | 11/2012 |
| EP | 3255537 A1 | 12/2017 |
| EP | 3872609 A1 | 9/2021 |
| JP | H10103994 A | 4/1998 |
| JP | 2006163647 A | 6/2006 |
| JP | 2014511524 A | 5/2014 |
| JP | 2016062481 A | 4/2016 |
| JP | 2016517991 A | 6/2016 |
| KR | 20140046329 A | 4/2014 |
| KR | 20150039326 A | 4/2015 |
| KR | 20170093658 A | 8/2017 |
| WO | 2014196063 A1 | 12/2014 |
| WO | 2017185327 A1 | 11/2017 |
| WO | 2018040010 A1 | 3/2018 |

OTHER PUBLICATIONS https://web.archive.org/web/20160101014622/http://www.amazon.com/, Amazon Website, published Jan. 1, 2016.

* cited by examiner

DISPLAYING INTERFACES IN DIFFERENT DISPLAY AREAS BASED ON ACTIVITIES

CROSS-REFERENCE TO RELATED APPLICATIONS

This is a continuation of U.S. patent application Ser. No. 17/296,841 filed on May 25, 2021, which is a U.S. National Stage of International Patent Application No. PCT/CN2019/119574 filed on Nov. 20, 2019, which claims priority to Chinese Patent Application No. 201811420187.5 filed on Nov. 26, 2018. All of the aforementioned applications are hereby incorporated by reference in their entireties.

TECHNICAL FIELD

Embodiments of this application relate to the field of electronic technologies, and in particular, to an application display method and an electronic device.

BACKGROUND

With development of electronic technologies, more services can be processed by portable electronic devices such as mobile phones and tablets, and more applications can be used on electronic devices. Generally, a user uses an application on an electronic device in a portrait orientation state of the electronic device, and the application on the electronic device can usually support display in a portrait mode. In a portrait orientation state, a height of a display screen is greater than a width of the display screen, that is, a vertical length of the display screen is greater than a horizontal length of the display screen. When an electronic device is in a landscape orientation state, a width of the display screen is greater than a height of the display screen, that is, a horizontal length of the display screen is greater than a vertical length of the display screen; and consequently, some applications cannot be normally displayed.

SUMMARY

Embodiments of this application provide an application display method and an electronic device, to normally display an interface of an application in a landscape orientation state of an electronic device.

To achieve the foregoing objective, the following technical solutions are used in the embodiments of this application.

According to a first aspect, an embodiment of this application provides an application display method. The method is applied to an electronic device including a first application. The application display method includes: An electronic device detects a first operation. The electronic device displays, in a landscape orientation state, a first interface of a first application in a first area of a display screen in response to the first operation. The electronic device detects a second operation performed on the first interface, where the second operation is used to open a second interface of the first application. The electronic device displays the second interface in a second area in response to the second operation. The display screen includes at least two areas, the at least two areas include the first area and the second area, and different areas do not overlap. In this solution, in the landscape orientation state of the electronic device, the display screen is divided into the first area and the second area, each of which is relatively narrow. In this case, the electronic device can display the first interface of the first application in the first area, and display a second interface of a second application in the second area.

In a possible implementation, when the electronic device displays, in the landscape orientation state, the first interface of the first application in the first area of the display screen of the electronic device in response to the first operation, the electronic device does not display an interface of the first application in the second area. For example, a pattern (for example, a wallpaper pattern) may be displayed in the second area; a desktop background may be displayed in the second area, that is, a part of the desktop background is presented in the second area; or the second area may be blank.

In another possible implementation, an absolute value of a difference between an aspect ratio of each area and a preset ratio is less than or equal to a first preset value, and the aspect ratio is a ratio between a vertical length and a horizontal length of the area in the landscape orientation state.

In this way, the aspect ratio of each area divided from the display screen differs slightly from the preset ratio, and the area is vertical bar-shaped. Therefore, an interface of the first application can be normally displayed in each area.

In another possible implementation, that the electronic device displays the second interface in a second area in response to the second operation includes: If the second interface and the first interface correspond to a same level, the electronic device displays the second interface in the second area in response to the second operation. The method further includes: If the second interface is at a level lower than the first interface, the electronic device displays the second interface in the first area in response to the second operation.

In another possible implementation, when the electronic device displays the second interface in the second area in response to the second operation, the first interface is still displayed in the first area, that is, content displayed in the second area remains unchanged.

In another possible implementation, the landscape orientation state is a state in which an included angle between long sides of the display screen and a horizontal plane is less than or equal to a second preset value.

In other words, in the landscape orientation state, the display screen of the electronic device is basically horizontal bar-shaped for a user.

In another possible implementation, before the electronic device detects the first operation, the method further includes: The electronic device displays a desktop in full screen in the landscape orientation state. The first operation is an operation used to start the first application.

In other words, when displaying the desktop in a landscape mode, the electronic device may display, in response to a user operation, an interface of the first application in an area divided from the display screen.

In another possible implementation, before the electronic device detects the first operation, the method further includes: The electronic device displays the first interface in full screen in a portrait orientation state. The first operation is an operation of switching from the portrait orientation state to the landscape orientation state.

In other words, when displaying the first interface in a portrait mode, after the electronic device display is switched to the landscape orientation state, the electronic device may display the first interface in the area divided from the display screen.

In another possible implementation, the method further includes: The electronic device detects a third operation performed on the first interface, where the third operation is used to open a third interface of the first application. If the third interface and the first interface correspond to a same level, in response to the third operation, the electronic device displays the third interface in the first area and still displays the second interface in the second area. Alternatively, if the third interface is an interface at a level lower than the first interface, in response to the third operation, the electronic device displays the third interface in the second area and still displays the first interface in the first area.

In other words, the first interface and an interface that are at a same level are displayed in the first area, and an interface at a level lower than the first interface is displayed at the second area.

In another possible implementation, if the third interface is at a level higher than the first interface, the electronic device displays the third interface in the first area and still displays the second interface in the second area; or the electronic device displays the third interface in the first area and displays the first interface in the second area.

In another possible implementation, the method further includes: The electronic device detects a fourth operation performed on the second interface, where the fourth operation is used to open a fourth interface of the first application. If the fourth interface and the second interface correspond to a same level or the fourth interface is an interface at a level lower than the second interface, in response to the fourth operation, the electronic device displays the fourth interface in the second area and still displays the first interface in the first area.

In this solution, an interface at a same level as the second interface and an interface at a level lower than the second interface are displayed in the second area.

In another possible implementation, the method further includes: The electronic device detects a fourth operation performed on the second interface, where the fourth operation is used to open a fourth interface of the first application. If the fourth interface and the second interface correspond to a same level, in response to the fourth operation, the electronic device displays the fourth interface in the second area and keeps the interface displayed in the first area unchanged. Alternatively, if the fourth interface is an interface at a level lower than the second interface, in response to the fourth operation, the electronic device displays the fourth interface in the second area and displays the second interface in the first area.

In this solution, an interface that is of the first application and that is displayed in the second area is an interface at a level lower than an interface that is of the first application and that is displayed in the first area.

In another possible implementation, the method further includes: The electronic device detects a fifth operation performed on the second interface, where the fifth operation is used to open a fifth interface of the first application. If the fifth interface is an interface at a level higher than the second interface, in response to the fifth operation, the electronic device displays the fifth interface in the second area and keeps the interface displayed in the first area unchanged. Alternatively, if the fifth interface is an interface at a level higher than the second interface, in response to the fifth operation, the electronic device displays the fifth interface in the first area and keeps the interface displayed in the second area unchanged.

In another possible implementation, if the fifth interface is the first interface at a level higher than the second interface, in response to the fifth operation, the electronic device stops displaying the second interface in the second area (where the content displayed in the second area may be the desktop) and still displays the first interface in the first area.

In another possible implementation, when the user faces the display screen of the electronic device, the second area is located on the right of the first area.

In this way, when the interface displayed in the second area, that is, on a right side, is at a level lower than the interface displayed in the first area, that is, on a left side, this can be convenient for the user to make contrast and perform an operation, and can better conform to use habits of most users. In addition, the first interface of the first application is first displayed on the left side, and the second interface of the second application is then displayed on the right side. This can better conform to use habits of most users.

In another possible implementation, the method further includes: The electronic device detects a sixth operation performed on the first interface, where the sixth operation is used to open a sixth interface of the first application. In response to the sixth operation, the electronic device displays the sixth interface in the second area and still displays the first interface in the first area.

In another possible implementation, the method further includes: The electronic device detects a seventh operation performed in the first area or the second area, where the seventh operation is used to open a seventh interface of the first application. In response to the seventh operation, the electronic device displays the seventh interface in the second area and still displays the first interface in the first area.

In another possible implementation, the method further includes: The electronic device detects an eighth operation performed in the first area, where the eighth operation is used to open an eighth interface of the first application; in this case, in response to the eighth operation, the electronic device displays the eighth interface in the second area and still displays the first interface in the first area. The electronic device detects a ninth operation performed in the second area, where the ninth operation is used to open a ninth interface of the first application; in this case, in response to the ninth operation, the electronic device displays the ninth interface in the first area and still displays the second interface in the second area.

In other words, after the first interface and the second interface of the first application are displayed in the landscape orientation state, an interface that is opened on an interface in a current area of the display screen is displayed in another area.

In another possible implementation, the electronic device detects an eighth operation performed in the first area, where the eighth operation is used to open an eighth interface of the first application; in this case, in response to the eighth operation, the electronic device displays the eighth interface in the first area and still displays the second interface in the second area. The electronic device detects a ninth operation performed in the second area, where the ninth operation is used to open a ninth interface of the first application; in this case, in response to the ninth operation, the electronic device displays the ninth interface in the second area and still displays the first interface in the first area.

In other words, after the first interface and the second interface of the first application are displayed in the landscape orientation state, an interface that is opened on an interface in a current area of the display screen is still displayed in the current area.

In another possible implementation, that the electronic device displays a first interface of a first application in a first area of a display screen of the electronic device includes: If the first application does not support landscape-mode fullscreen display, the electronic device displays the first interface of the first application in the first area of the display screen. If the first application supports landscape-mode full-screen display, the electronic device prompts the user to select a display manner, where the display manner includes a landscape-mode full-screen display manner and an area display manner; and in response to the area display manner selected by the user, the electronic device displays the first interface of the first application in the first area of the display screen.

In other words, the user can decide whether a manner of displaying an interface of the first application is the landscape-mode full-screen display manner or the area display manner.

In another possible implementation, the method further includes: If the electronic device is switched to the portrait orientation state, the electronic device displays a tenth interface of the first application in full screen in the portrait orientation state. The portrait orientation state is a state in which the included angle between the long sides of the display screen and the horizontal plane is greater than the second preset value.

In another possible implementation, if the electronic device is switched to the portrait orientation state, the tenth interface displayed by the electronic device in full screen in the portrait orientation state may be an interface that is most recently displayed by the electronic device in the landscape orientation state; may be an interface on which a user operation is most recently detected by the electronic device in the landscape orientation state; or may be an interface that is most recently displayed by the electronic device in a preset area in the landscape orientation state.

According to a second aspect, a technical solution of this application provides an application display apparatus. The apparatus is included in an electronic device, and the apparatus has a function of implementing behavior of the electronic device in the method according to any one of the first aspect or the possible implementations of the first aspect. The function may be implemented by using hardware, or may be implemented by hardware executing corresponding software. The hardware or software includes one or more modules or units corresponding to the function, for example, a display module or unit and a detection module or unit.

According to a third aspect, an embodiment of this application provides an electronic device, including one or more processors and one or more memories. The one or more memories are coupled to the one or more processors. The one or more memories are configured to store computer program code, where the computer program code includes a computer instruction. When the one or more processors execute the computer instruction, the electronic device is enabled to perform the application display method according to any one of the possible implementations of the first aspect.

According to a fourth aspect, an embodiment of this application provides a computer storage medium, including a computer instruction. When the computer instruction is run on an electronic device, the electronic device is enabled to perform the application display method according to any one of the possible implementations of the first aspect.

According to a fifth aspect, an embodiment of this application provides a computer program product. When the computer program product is run on a computer, an electronic device is enabled to perform the application display method according to any one of the possible implementations of the first aspect.

DESCRIPTION OF EMBODIMENTS

Figure 1:
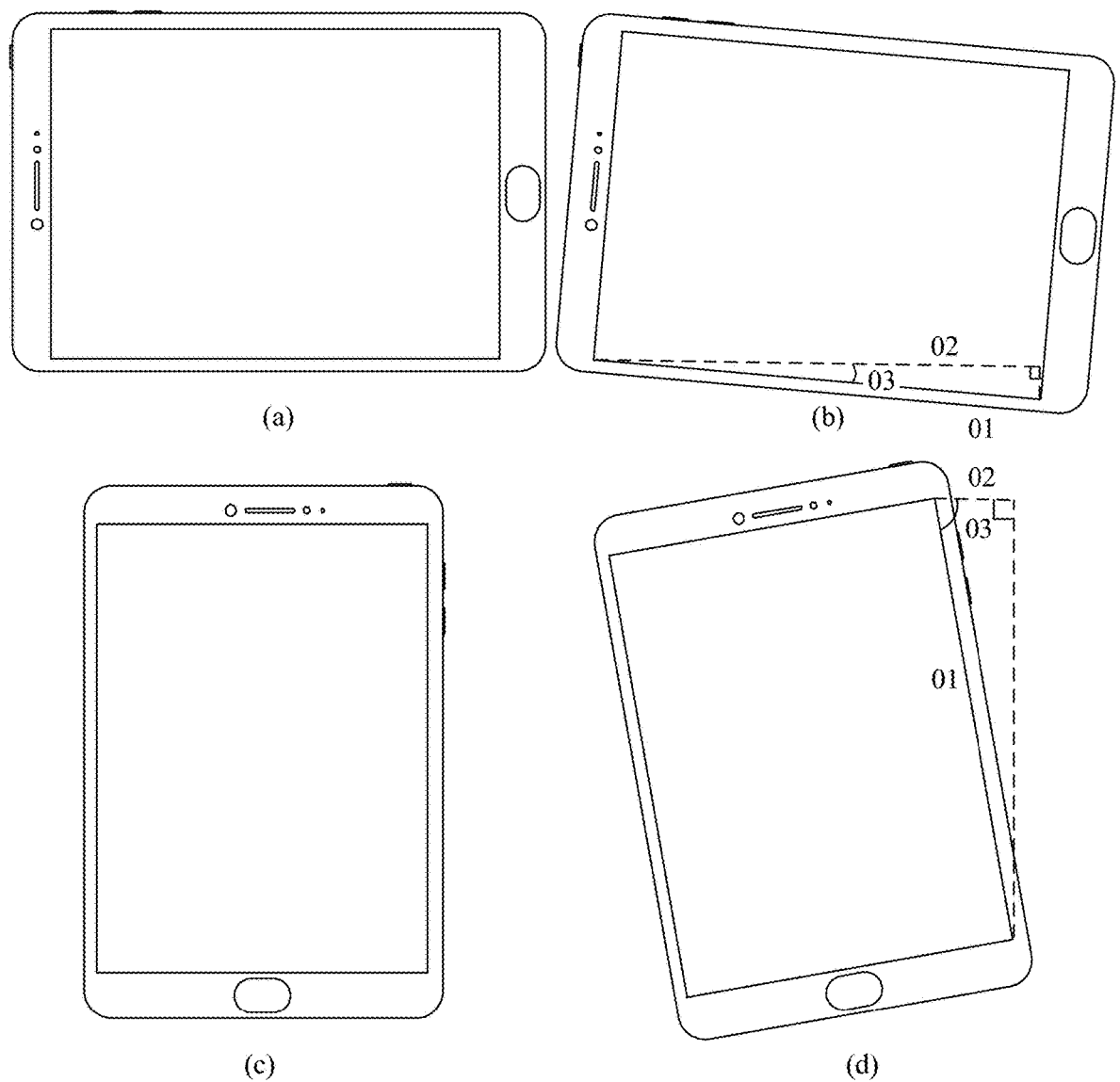
FIG. 1 is schematic diagrams of landscape orientation states and portrait orientation states of an electronic device according to an embodiment of this application.

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of this embodiment, unless otherwise stated, "a plurality of" means two or more than two.

When a user uses an electronic device, the electronic device may be in a landscape orientation state or a portrait orientation state. A display screen of the electronic device may include four sides. The four sides include two longer sides that are equal and parallel to each other and that may be referred to as long sides of the display screen. The four sides further include two shorter sides that are equal and parallel to each other and that may be referred to as short sides of the display screen. In the landscape orientation state, the long sides of the display screen of the electronic device are parallel to a horizontal plane (for example, as shown in (a) in FIG. 1), that is, an included angle between the long sides of the display screen and the horizontal plane is 0. Alternatively, an included angle 03 between a long side 01 of the display screen and a projection 02 of the long side 01 onto a horizontal plane is less than or equal to a preset value 1 (for example, as shown in (b) in FIG. 1), that is, an included angle between the long sides of the display screen and the horizontal plane is less than or equal to the preset value 1. The preset value 1 (that is, a second preset value) is less than or equal to 45°, and a specific value of the preset value 1 may be set depending on an actual application scenario. For example, the preset value 1 may be 20°. In the landscape orientation state, the display screen of the electronic device is basically horizontal bar-shaped.

In the landscape orientation state, a height of the display screen of the electronic device is less than a width of the display screen, and a depth-to-width ratio (that is, a ratio of the height to the width) of the display screen is less than 1. The height of the display screen is a length of a side, of the display screen, that has a relatively small included angle with a vertical plane. The width of the display screen is a length of a side, of the display screen, that has a relatively small included angle with a horizontal plane. The height of the display screen can also be understood as a vertical length of the display screen, the width of the display screen can also be understood as a horizontal length of the display screen, and the depth-to-width ratio of the display screen can also be understood as an aspect ratio (that is, a ratio of the vertical length to the horizontal length) of the display screen.

In the portrait orientation state, the long sides of the display screen of the electronic device are perpendicular to a horizontal plane (for example, as shown in (c) in FIG. 1). Alternatively, an included angle 03 between a long side 01 of the display screen and a projection 02 of the long side 01 onto a horizontal plane is greater than a preset value 1 (for example, as shown in (d) in FIG. 1, the preset value 1 is greater than or equal to 45°). In the portrait orientation state, a height of the display screen of the electronic device is greater than a width of the display screen, a depth-to-width ratio of the display screen is greater than 1, and the display screen of the electronic device is basically vertical bar-shaped.

At present, when an electronic device is in a portrait orientation state, a depth-to-width ratio of a display screen is usually a conventional ratio such as 16:9, 18:9, 20:9, or 16:10. Display configurations of most applications in the electronic device are also adapted to this conventional ratio. In the portrait orientation state, the depth-to-width ratio of the display screen of the electronic device is equal to or differs slightly from the conventional ratio, and therefore the electronic device can normally display interfaces of applications. When the electronic device is in a landscape orientation state, the depth-to-width ratio of the display screen of the electronic device differs greatly from the conventional ratio, and consequently the electronic device possibly cannot normally display interfaces of applications.

An embodiment of this application provides an application display method. In a landscape orientation state, a horizontal bar-shaped display screen of an electronic device may be divided into a plurality of narrow vertical bar-shaped areas. These areas are used by the electronic device for display, and therefore these areas may also be referred to as display areas. Different display areas do not overlap, and a difference between a depth-to-width ratio of each display area and a preset ratio is relatively small. For example, an absolute value of the difference between the depth-to-width ratio of each display area and the preset ratio is less than or equal to a preset value 2 (that is, a first preset value). The electronic device can normally display an interface of an application in a vertical bar-shaped display area.

A depth-to-width ratio of a display area may be a ratio of a height to a width of the display area. The height of the display area is a length of a side, of the display area, that has a relatively small included angle with a vertical plane. The width of the display area is a length of a side, of the display area, that has a relatively small included angle with a horizontal plane. In the landscape orientation state shown in (a) in FIG. 1, the height of the display area is a length of a side, of the display area, that is parallel to the vertical plane; and the width of the display area is a length of a side, of the display area, that is parallel to the horizontal plane. The height of the display area can also be understood as a vertical length of the display area, the width of the display area can also be understood as a horizontal length of the display area, and the depth-to-width ratio of the display area can also be understood as an aspect ratio of the display area.

The display method provided in this embodiment of this application can be applied to an electronic device such as a tablet, a mobile phone, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in this embodiment of this application.

Figure 2A:
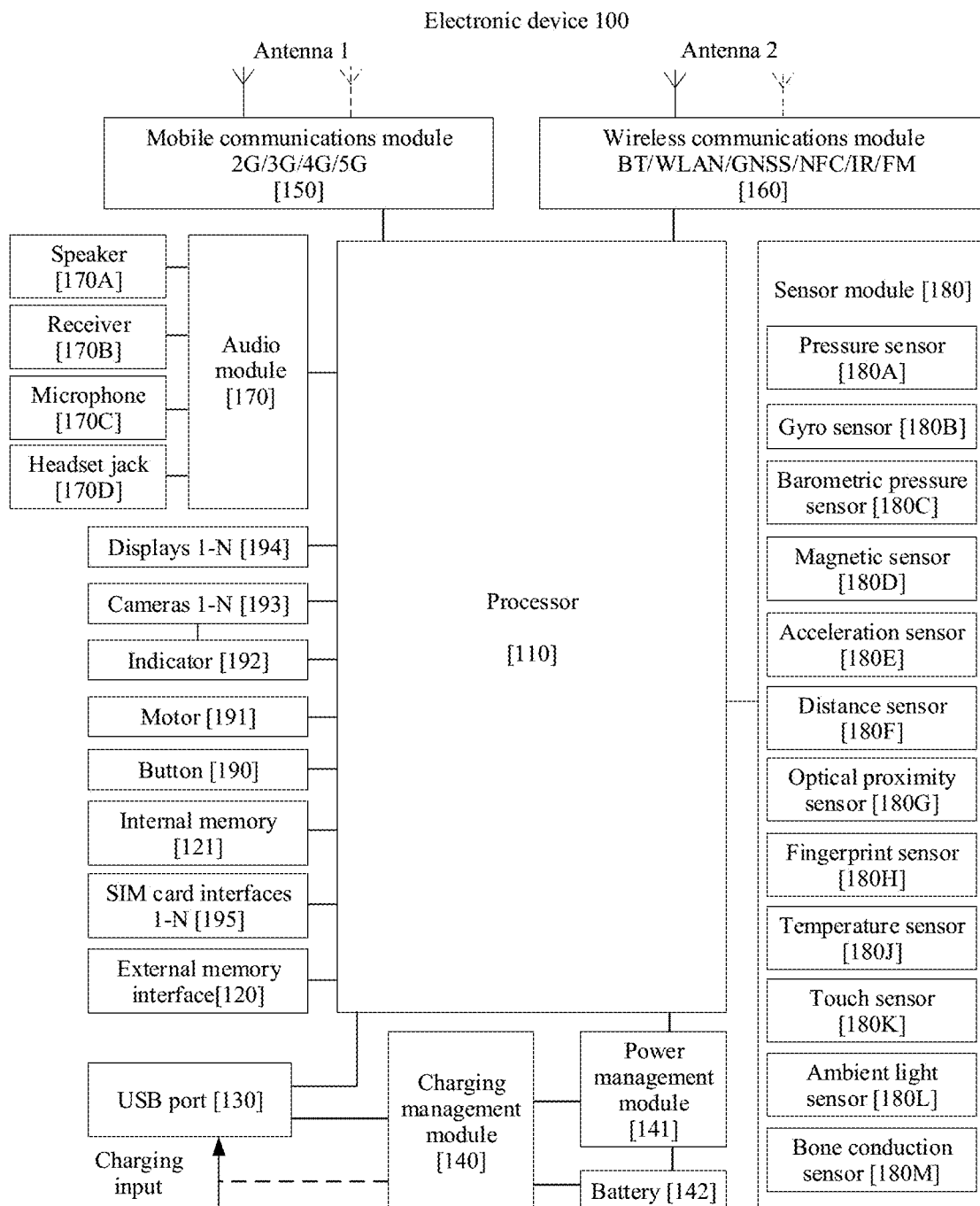
FIG. 2A is a schematic diagram of a hardware structure of an electronic device according to an embodiment of this application.

For example, FIG. 2A is a schematic structural diagram of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a key 190, a motor 191, an indicator 192, a camera 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, a gravity sensor, and the like.

It can be understood that the structure illustrated in this embodiment of this application does not constitute any specific limitation on the electronic device 100. In some other embodiments of this application, the electronic device 100 may include more or fewer components than those shown in the figure, a combination of some components, splitting of some components, or a different arrangement of the components. The illustrated components may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a sequence signal, to control instruction fetching and instruction execution.

The processor 110 may further be provided with a memory, configured to store an instruction and data. In some embodiments, the memory in the processor 110 is a cache memory. The memory may store an instruction or data recently used or cyclically used by the processor 110. If the processor 110 needs to use the instruction or data again, the processor 110 may directly invoke the instruction or data from the memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of I2S buses. The processor 110 may be coupled to the audio module 170 through an I2S bus, to implement communication between the processor 110 and the audio module 170. In some embodiments, the audio module 170 may transfer an audio signal to the wireless communications module 160 through an I2S interface, to implement a function of answering a call by using a Bluetooth headset.

The PCM interface may also be used for audio communication, to perform sampling, quantization, and encoding on an analog signal. In some embodiments, the audio module 170 may be coupled to the wireless communications module 160 through the PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be used for audio communication.

The UART interface is a universal serial data bus for asynchronous communication. The bus is a two-way communications bus that converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to peripheral components such as the display screen 194 and the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display screen 194 through the DSI interface, to implement a display function of the electronic device 100.

The GPIO interface may be configured by using software. The GPIO interface may be configured as a control signal path, or may be configured as a data signal path. In some embodiments, the GPIO interface may be configured to connect the processor 110 to the camera 193, the display screen 194, the wireless communications module 160, the audio module 170, the sensor module 180, and the like. The GPIO interface may further be configured as an I2C interface, an I2S interface, a UART interface, a MIPI interface, or the like.

The USB interface 130 is an interface complying with the USB standard specification, and may be specifically a mini USB interface, a micro USB interface, a USB type C interface, or the like. The USB interface 130 may be configured to connect to the charger to charge the electronic device 100, may also be configured for data transmission between the electronic device 100 and a peripheral device, and may also be configured to connect to an earphone to play audio through the earphone. The interface may further be configured to connect to another electronic device such as an AR device.

It can be understood that interface connection relationships between the modules that are described in this embodiment of this application are merely examples for description, and do not constitute any limitation on a structure of the electronic device 100. In some other embodiments of this application, alternatively, the electronic device 100 may use interface connection manners different from those in this embodiment or use a combination of a plurality of interface connection manners.

The charging management module 140 is configured to receive a charging input from the charger. The charger may be a wireless charger or a wired charger. In some wired charging embodiments, the charging management module 140 may receive a charging input from a wired charger through the USB interface 130. In some wireless charging embodiments, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input from the battery 142 and/or an input from the charging management module 140, to supply power to the processor 110, the internal memory 121, an external memory, the display screen 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be multiplexed to improve antenna utilization. For example, the antenna 1 may be multiplexed into a diversity antenna of a wireless local area. In some other embodiments, an antenna may be used in combination with a tuning switch.

The mobile communications module 150 may provide wireless communication solutions, including 2G, 3G, 4G, 5G, and the like, applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1; perform filtering, amplification, and other processing on the received electromagnetic wave; and transfer a processed electromagnetic wave to the modem processor for demodulation. The mobile communications module 150 may further amplify a signal modulated by the modem processor, convert an amplified signal into an electromagnetic wave by using the antenna 1, and radiate the electromagnetic wave through the antenna 1. In some embodiments, at least some function modules of the mobile communications module 150 may be disposed in the processor 110. In some embodiments, at least some function modules of the mobile communications module 150 may be disposed in a same component as at least some modules of the processor 110.

The modem processor may include a modulator and a demodulator. The modulator is configured to modulate a to-be-sent low frequency baseband signal into a medium/high frequency signal. The demodulator is configured to demodulate a received electromagnetic wave signal into a low frequency baseband signal. Then, the demodulator transfers the low frequency baseband signal obtained through demodulation to the baseband processor for processing. After the low frequency baseband signal is processed by the baseband processor, a processed low frequency baseband signal is transferred to the application processor. The application processor outputs a sound signal through an audio device (which is not limited to the speaker 170A and the telephone receiver 170B), or displays an image or a video through the display screen 194. In some embodiments, the modem processor may be an independent component. In some other embodiments, the modem processor may be independent of the processor 110, and is disposed in a same component as the mobile communications module 150 or another function module.

The wireless communications module 160 may provide wireless communication solutions applied to the electronic device 100, for example, wireless local area network (wireless local area networks, WLAN) (such as wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), and infrared (infrared, IR) technologies. The wireless communications module 160 may be one or more components integrated with at least one communication processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification processing on the to-be-sent signal, convert a processed to-be-sent signal into an electromagnetic wave by using the antenna 2, and radiate the electromagnetic wave through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time division-synchronous code division multiple access (time-division code division multiple access, TD-SCDMA), long term evolution (long term evolution, LTE), BT, GNSS, WLAN, NFC, FM, IR, and/or other technologies. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to perform graphics rendering. The processor 110 may include one or more GPUs, and execute a program instruction to generate or change display information.

The display screen 194 is configured to display an image, a video, and the like. The display screen 194 includes a display panel. The display panel may use a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flex light-emitting diode, FLED), a mini LED, a micro LED, a micro OLED, a quantum dot light-emitting diode (quantum dot light emitting diodes, QLED), or the like. In some embodiments, the electronic device 100 may include one or N display screens 194, where N is a positive integer greater than 1. In this embodiment of this application, in a landscape orientation state, the display screen 194 may include a plurality of display areas, and different interfaces of one application may be simultaneously displayed in different display areas.

The electronic device 100 may implement a photographing function by using the ISP, the camera 193, the video codec, the GPU, the display screen 194, the application processor, and the like.

The ISP is configured to process data fed back by the camera 193. For example, during photographing, after a shutter is opened, light is transferred to a photosensitive element of the camera through a lens, an optical signal is converted into an electrical signal, and the photosensitive element of the camera transfers the electrical signal to the ISP for processing, to convert the electrical signal into an image visible to naked eyes. The ISP may further perform algorithm-based optimization on the image in terms of noise, brightness, and skin color. The ISP may further optimize parameters such as an exposure and a color temperature in a photographing scenario. In some embodiments, the ISP may be disposed in the camera 193.

The camera 193 is configured to capture a static image or a video. An optical image of an object is generated through the lens and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP for converting the electrical signal into a digital image signal. The ISP outputs the digital image signal to the DSP for processing. The DSP converts the digital image signal into an image signal in a standard RGB or YUV format or the like. In some embodiments, the electronic device 100 may include one or N cameras 193, where N is a positive integer greater than 1.

The digital signal processor is configured to process a digital signal. The digital signal processor not only can process the digital image signal, but also can process other digital signals. For example, when the electronic device 100 selects a frequency, the digital signal processor is configured to perform Fourier transformation on frequency energy, and the like.

The video codec is configured to compress or decompress a digital video. The electronic device 100 can support one or more types of video codecs. In this way, the electronic device 100 may play or record videos in a plurality of encoding formats, for example, a moving picture experts group (moving picture experts group, MPEG)-1, MPEG-2, MPEG-3, and MPEG-4.

The NPU is a neural-network (neural-network, NN) computing processor that rapidly processes input information by using a biological neural network structure, for example, by using a mode of transfer between human brain neurons, and may further perform continuous self-learning. Applications such as intelligent cognition of the electronic device 100, for example, image recognition, facial recognition, voice recognition, and text understanding, can be implemented by using the NPU.

The external memory interface 120 may be configured to connect to an external memory card, for example, a micro SD card, to expand a storage capability of the electronic device 100. The external memory card communicates with the processor 110 through the external memory interface 120, to implement a data storage function, for example, to store music, video, and other files in the external memory card.

The internal memory 121 may be configured to store computer executable program code, where the executable program code includes an instruction. The processor 110 performs various function applications and data processing of the electronic device 100 by running the instruction stored in the internal memory 121. The internal memory 121 may include a program storage area and a data storage area. The program storage area may store an operating system, an application program required by at least one function (for example, a voice playback function or an image playback function), and the like. The data storage area may store data (such as audio data and a phone book) created during use of the electronic device 100, and the like. In addition, the internal memory 121 may include a high-speed random access memory, and may further include a non-volatile memory such as at least one magnetic disk storage device, a flash memory device, and a universal flash storage (universal flash storage, UFS).

The electronic device 100 may implement an audio function, such as music playing and recording, by using the audio module 170, the speaker 170A, the telephone receiver 170B, the microphone 170C, the earphone jack 170D, the application processor, and the like.

The audio module 170 is configured to convert digital audio information into an analog audio signal output, and is also configured to convert an analog audio input into a digital audio signal. The audio module 170 may further be configured to encode and decode audio signals. In some embodiments, the audio module 170 may be disposed in the processor 110, or some function modules of the audio module 170 may be disposed in the processor 110.

The speaker 170A, also referred to as a "loudspeaker", is configured to convert an audio electrical signal into a sound signal. The electronic device 100 may be used for listening to music or answering a hands-free call by using the speaker 170A.

The telephone receiver 170B, also referred to as an "earpiece", is configured to convert an audio electrical signal into a sound signal. When a call or voice information is received on the electronic device 100, voice can be heard by putting the telephone receiver 170B near a human ear.

The microphone 170C, also be referred to as a "mic" or a "mike", is configured to convert a sound signal into an electrical signal. When making a call or sending voice information, a user may put the microphone 170C near the mouth and speak, to input a sound signal into the microphone 170C. The electronic device 100 may be provided with at least one microphone 170C. In some other embodiments, the electronic device 100 may be provided with two microphones 170C, which may further implement a noise canceling function in addition to sound signal collection. In some other embodiments, the electronic device 100 may alternatively be provided with three, four, or more microphones 170C, which implement sound signal collection and noise canceling, and may further identify a sound source, to implement a directional recording function and the like.

The earphone jack 170D is configured to connect to a wired earphone. The earphone jack 170D may be a USB interface 130, or may be a 3.5 mm open mobile terminal platform (open mobile terminal platform, OMTP) standard interface or a Cellular Telecommunications Industry Association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. A capacitive pressure sensor may include at least two parallel plates made of a conducting material. When force is exerted on the pressure sensor 180A, a capacitance between electrodes changes. The electronic device 100 determines a strength of the pressure based on a change of the capacitance. When a touch operation is performed on the display screen 194, the electronic device 100 detects a strength of the touch operation by using the pressure sensor 180A. The electronic device 100 may also calculate a touch location based on a signal detected by the pressure sensor 180A. In some embodiments, touch operations that are performed on a same touch location but have different touch operation strengths may correspond to different operation instructions. For example, when a touch operation with a touch operation strength less than a first pressure threshold is performed on an icon of an SMS message application, an instruction for viewing an SMS message is executed. When a touch operation with a touch operation strength greater than or equal to the first pressure threshold is performed on the icon of the SMS message application, an instruction for creating an SMS message is executed.

The gyroscope sensor 180B may be configured to determine a moving posture of the electronic device 100. In some embodiments, angular velocities of the electronic device 100 relative to three axes (that is, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the electronic device 100 jitters; and calculates, based on the angle, a distance that needs to be compensated by a lens module, to allow the lens to counteract the jitter of the electronic device 100 through reverse motion, thereby implementing image stabilization. The gyroscope sensor 180B may also be used in navigation and motion sensing game scenarios.

The barometric pressure sensor 180C is configured to measure atmospheric pressure. In some embodiments, the electronic device 100 calculates an altitude based on the atmospheric pressure value measured by the barometric pressure sensor 180C, to assist in positioning and navigation.

The magnetic sensor 180D includes a Hall effect sensor. The electronic device 100 may detect opening/closing of a flip leather case by using the magnetic sensor 180D. In some embodiments, when the electronic device 100 is a flip phone, the electronic device 100 may detect opening/closing of a clamshell by using the magnetic sensor 180D. Further, a feature such as automatic unlocking implemented when the flip phone is flipped open is set based on a detected open/closed state of the leather case or a detected open/closed state of the clamshell.

The acceleration sensor 180E may detect magnitude of accelerations of the electronic device 100 in all directions (usually along three axes), and may detect magnitude and a direction of gravity when the electronic device 100 is still. The acceleration sensor 180E may further be configured to identify a posture of the electronic device, and is applied to screen switching between a landscape mode and a portrait mode, a pedometer, and other applications.

The distance sensor 180F is configured to measure a distance. The electronic device 100 may measure a distance in an infrared or a laser manner. In some embodiments, in a photographing scenario, the electronic device 100 may measure a distance by using the distance sensor 180F, to implement rapid focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects reflected infrared light from a nearby object by using the photodiode. When detecting sufficient reflected light, the electronic device 100 can determine that there is an object near the electronic device 100. When detecting insufficient reflected light, the electronic device 100 can determine that there is no object near the electronic device 100. By using the optical proximity sensor 180G, the electronic device 100 may detect that the user holds the electronic device 100 close to an ear during a call, to automatically turn off a screen for power saving. The optical proximity sensor 180G may also be used for automatic screen unlocking or locking in a leather case mode or a pocket mode.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to prevent touch by mistake.

The fingerprint sensor 180H is configured to collect a fingerprint. By using a feature of the collected fingerprint, the electronic device 100 may implement unlocking by using the fingerprint, access an application lock, take a photo by using the fingerprint, answer a call by using the fingerprint, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 degrades performance of the processor nearby the temperature sensor 180J, to reduce power consumption for thermal protection. In some other embodiments, when the temperature is less than another threshold, the electronic device 100 heats up the battery 142, to avoid abnormal power-off of the electronic device 100 due to a low temperature. In some other embodiments, when the temperature is less than still another threshold, the electronic device 100 increases an output voltage of the battery 142, to avoid abnormal power-off due to a low temperature.

The touch sensor 180K is also referred to as a "touch panel". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. A visual output related to the touch operation may be provided by using the display screen 194. In some other embodiments, the touch sensor 180K may alternatively be disposed on a surface of the electronic device 100, and a location of the touch sensor 180K is different from that of the display screen 194.

The bone conduction sensor 180M may obtain a vibration signal. In some embodiments, the bone conduction sensor 180M may obtain a vibration signal of a vibrating bone block of a vocal-cord part of a human body. The bone conduction sensor 180M may also be in contact with a pulse of a human body to receive blood pressure fluctuating signals. In some embodiments, the bone conduction sensor 180M may alternatively be disposed in an earphone, to form a bone conduction earphone in combination. The audio module 170 may obtain a voice signal by parsing the vibration signal of the vibrating bone block of the vocal-cord part obtained by the bone conduction sensor 180M, to implement a voice function. The application processor may obtain heart rate information by parsing the blood pressure fluctuating signals obtained by the bone conduction sensor 180M, to implement a heart rate detection function.

The electronic device 100 may determine whether the electronic device is currently in a landscape orientation state or a portrait orientation state, by using one or more sensors: the acceleration sensor 180E, the gyroscope sensor 180B, or the gravity sensor.

The key 190 includes an on/off key, a volume key, and the like. The key 190 may be a mechanical key, or may be a touch key. The electronic device 100 may receive a key input, and generate a key signal input related to a user setting and function control of the electronic device 100.

The motor 191 may generate a vibration alert. The motor 191 may be configured to provide an incoming call vibration alert and a touch vibration feedback. For example, touch operations performed on different applications (such as photographing and audio playback) may correspond to different vibration feedback effects. For touch operations performed in different areas of the display screen 194, the motor 191 may also correspond to different vibration feedback effects. Different application scenarios (such as time reminding, information receiving, an alarm clock application, and a game application) may also correspond to different vibration feedback effects. A touch vibration feedback effect can also be customized.

The indicator 192 may be an indicator light, may be configured to indicate a charging status and a battery level change, and may also be configured to indicate a message, a missed call, a notification, and the like.

The SIM card interface 195 is configured to connect to a SIM card. The SIM card may be inserted into the SIM card interface 195 or removed from the SIM card interface 195, to come into contact with or be separated from the electronic device 100. The electronic device 100 can support one or N SIM card interfaces, where N is a positive integer greater than 1. The SIM card interface 195 can support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external memory card. The electronic device 100 interacts with a network by using a SIM card, to implement a call function, a data communication function, and the like. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event driven architecture, a microkernel architecture, a microservices-based architecture, or a cloud architecture. In this embodiment of this application, an Android system with a layered architecture is used as an example for describing a software structure of the electronic device 100.

Figure 2B:
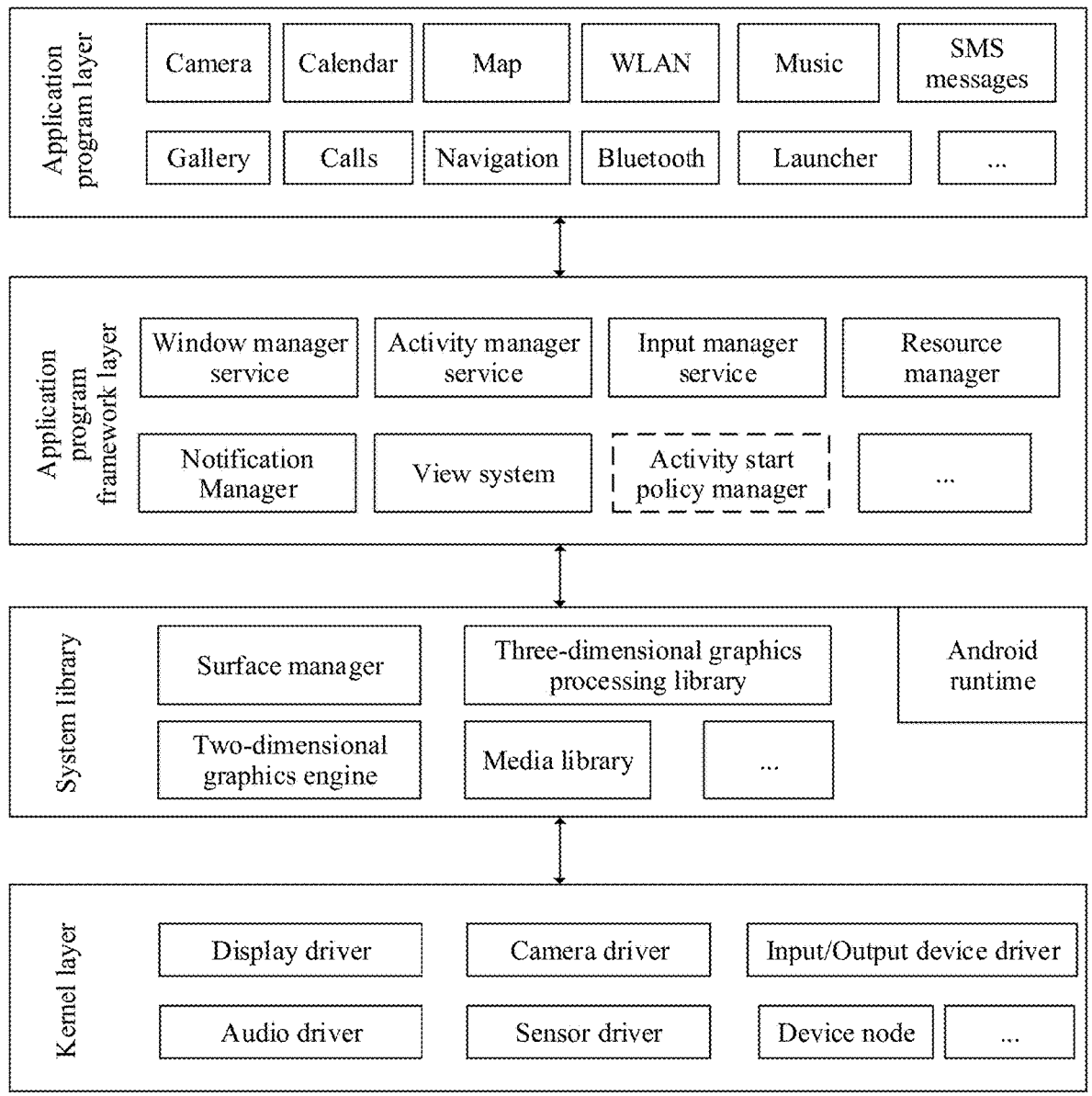
FIG. 2B is a schematic diagram of a software structure of an electronic device according to an embodiment of this application.

FIG. 2B is a block diagram of a software structure of an electronic device 100 according to an embodiment of this application. In the layered architecture, software is divided into several layers, and each layer has clear roles and tasks. The layers communicate with each other through a software interface. In some embodiments, the Android system is divided into four layers from top to bottom: an application program layer, an application program framework layer, an Android runtime (Android runtime) and a system library, and a kernel layer. The application program layer may include a series of application program packages.

As shown in FIG. 2B, the application program packages may include application programs such as camera, gallery, calendar, calls, map, navigation, WLAN, Bluetooth, music, video, SMS messages, and a desktop launcher (Launcher) application. For ease of description, an application program is referred to as an application for short below. Applications in the electronic device may be native applications, or may be third-party applications. This is not limited in this embodiment of this application.

The application program framework layer provides an application programming interface (application programming interface, API) and a programming framework for an application program at the application program layer. The application program framework layer includes some predefined functions.

As shown in FIG. 2B, the application program framework layer may include a window manager service (window manager service, VMS), an activity manager service (activity manager service, AMS), an input manager service (input manager service, IMS), a content provider, a view system, a phone manager, a resource manager, a notification manager, and the like.

The window manager service is configured to manage a window program. The window manager may obtain a size of a display screen, determine whether there is a status bar, perform screen locking, take a screenshot, and the like.

The activity manager service (activity manager service, AMS) is responsible for managing activities, and is responsible for start, switching, scheduling of components, management and scheduling of application programs, and other work.

The input manager service (input manager service, IMS) may be configured to: perform processing such as translation and encapsulation on an original input event, to obtain an input event containing more information; and send the input event to the window manager service. The window manager service stores an area that is of each application program and that can be tapped (for example, a control), location information of a focus window, and the like. Therefore, the window manager service can correctly distribute the input event to a specified control or focus window.

The content provider is configured to: store and obtain data, and enable the data to be accessible by an application program. The data may include a video, an image, audio, calls that are made and answered, a browsing history and a bookmark, a phone book, and the like.

The view system includes visual controls, for example, a control for displaying a text and a control for displaying an image. The view system may be configured to construct an application program. A display interface may include one or more views. For example, a display interface including an SMS message notification icon may include a text display view and an image display view.

The phone manager is configured to provide a communication function of the electronic device 100, for example, management of a call status (including connected, hang up, and the like).

The resource manager provides application programs with various resources such as a localized character string, an icon, an image, a layout file, and a video file.

The notification manager enables an application program to display notification information in a status bar, and may be configured to convey a notification type message. The notification manager may automatically disappear after a short pause without requiring a user interaction. For example, the notification manager is configured to notify download completion and provide a message alert. The notification manager may alternatively provide a notification that appears in a top status bar of the system in a form of a graph or a scroll bar text, for example, a notification of an application program running in a background, or may provide a notification that appears on a screen in a form of a dialog box. For example, text information is displayed in the status bar, an alert tone is provided, the electronic device vibrates, or an indicator light flashes.

The Android runtime includes a core library and a virtual machine. The Android runtime is responsible for scheduling and management of the Android system.

The core library includes two parts: one part is a performance function that needs to be called by a java language, and the other part is an Android core library.

The application program layer and the application program framework layer run in the virtual machine. The virtual machine executes java files of the application program layer and the application program framework layer as binary files. The virtual machine is configured to implement functions such as object lifecycle management, stack management, thread management, security and exception management, and garbage collection.

The system library may include a plurality of function modules, such as a surface manager (surface manager), a media library (Media Libraries), a three-dimensional graphics processing library (for example, OpenGL ES), and a 2D graphics engine (for example, SGL).

The surface manager is configured to manage a display subsystem, and fuse 2D and 3D layers for a plurality of application programs.

The media library supports playback and recording of audio and videos in a plurality of commonly used formats, and supports static image files and the like. The media library can support a plurality of audio and video encoding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer may include a display driver, an input/output device driver (for example, a keyboard, a touchscreen, an earphone, a loudspeaker, and a microphone), a device node, a camera driver, an audio driver, a sensor driver, and the like. A user performs an input operation by using an input device. The kernel layer may generate a corresponding original input event based on the input operation, and store the original input event into the device node.

Display solutions provided in this embodiment of this application are implemented based on a freeform window (freeform) feature and a multi-window multi-task infrastructure of Google. In this embodiment of this application, referring to FIG. 2B, the application program framework layer may further include an activity start policy manager (activity start policy manager, ASPM), configured to determine information such as a startup parameter of an activity (Activity).

Figure 3:
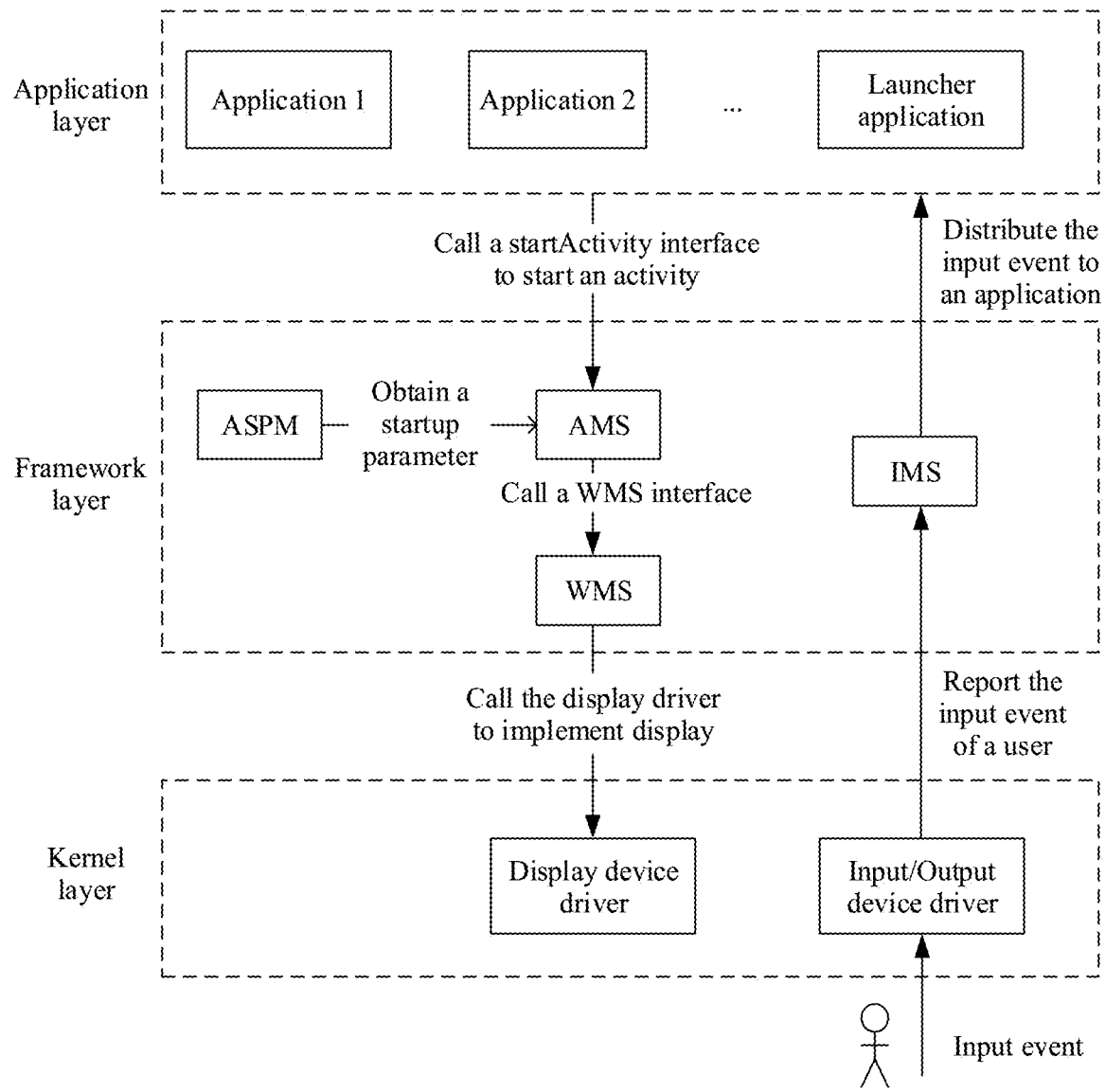
FIG. 3 is a schematic diagram of a display process according to an embodiment of this application.

Based on the foregoing software modules, a display procedure provided in an embodiment of this application may be shown in FIG. 3. Specifically, the input/output device driver may detect an input event of a user, for example, an input event in which a user starts an application by tapping an icon of the application, or an input event in which a user opens an interface by using a voice instruction. The input/output device driver reports the input event of the user to the IMS. The IMS distributes the input event to a corresponding application. The application calls a startActivity interface in the AMS to start an activity corresponding to the input event. The AMS requests to obtain a startup parameter from the ASPM. The ASPM determines the startup parameter and returns the startup parameter to the AMS. The AMS calls a WMS interface based on the startup parameter. The WMS draws, based on the startup parameter, a window corresponding to the activity, and calls the display driver to display an interface.

After obtaining the startup parameter, the WMS may determine, based on the startup parameter, whether an activity window matching the startup parameter exists in a background. If such an activity window exists, the WMS sets the background activity window matching the startup parameter to be visible. If such an activity window does not exist, the WMS creates an activity window based on the startup parameter and draws window content, and calls the display driver to display the drawn window content, to present the interface to the user.

Specifically, the ASPM may determine the startup parameter of the activity based on an activity start scenario. The startup parameter of the activity includes an activity window display manner, an activity window start location, a stack for starting the activity window, and information such as a width and a height in an application start configuration. The display manner includes full-screen display and area display. The activity start scenario includes: Whether the activity is started from a desktop, started from a current application, or started from another application, whether the electronic device is currently in a landscape orientation state or a portrait orientation state, whether the electronic device is currently in a full-screen display manner or an area display manner, and the like.

If the electronic device has stored a startup parameter of the activity (for example, a startup parameter that is set when an application program is developed, or a corresponding startup parameter when the electronic device is in a portrait mode), when the startup parameter determined by the ASPM is different from the stored startup parameter, the ASPM may modify the previously stored startup parameter to the startup parameter currently determined by the ASPM. For example, if the area display manner is used, in the startup parameter determined by the ASPM, the window start location may be a location of an $i^{th}$ display area on a touchscreen when the electronic device is in a landscape mode. For example, when the touchscreen includes a first display area and a second display area, the window start location may be the first display area and the second display area. The stack (Stack) for starting the window is a freeform stack (that is, an Android native multi-window dedicated stack stack). The information such as the width and the height in the application start configuration may be width information and height information of the $i^{th}$ display area. For another example, if the full-screen display manner is used, in the startup parameter determined by the ASPM, the window start location is a full screen. The stack (Stack) for starting the window may be a full-screen stack (fullscreen stack). The information such as the width and the height in the application start configuration may be width information and height information of the display screen in a full screen mode.

The following uses an example for detailing the technical solutions provided in the embodiments of this application. In the example, the electronic device is a tablet computer (referred to as a tablet for short below), a landscape orientation state is the state shown in (a) in FIG. 1, a portrait orientation state is the state shown in (c) in FIG. 1, and a display screen is divided into a first display area and a second display area when the tablet is in the landscape orientation state.

Figure 4A:
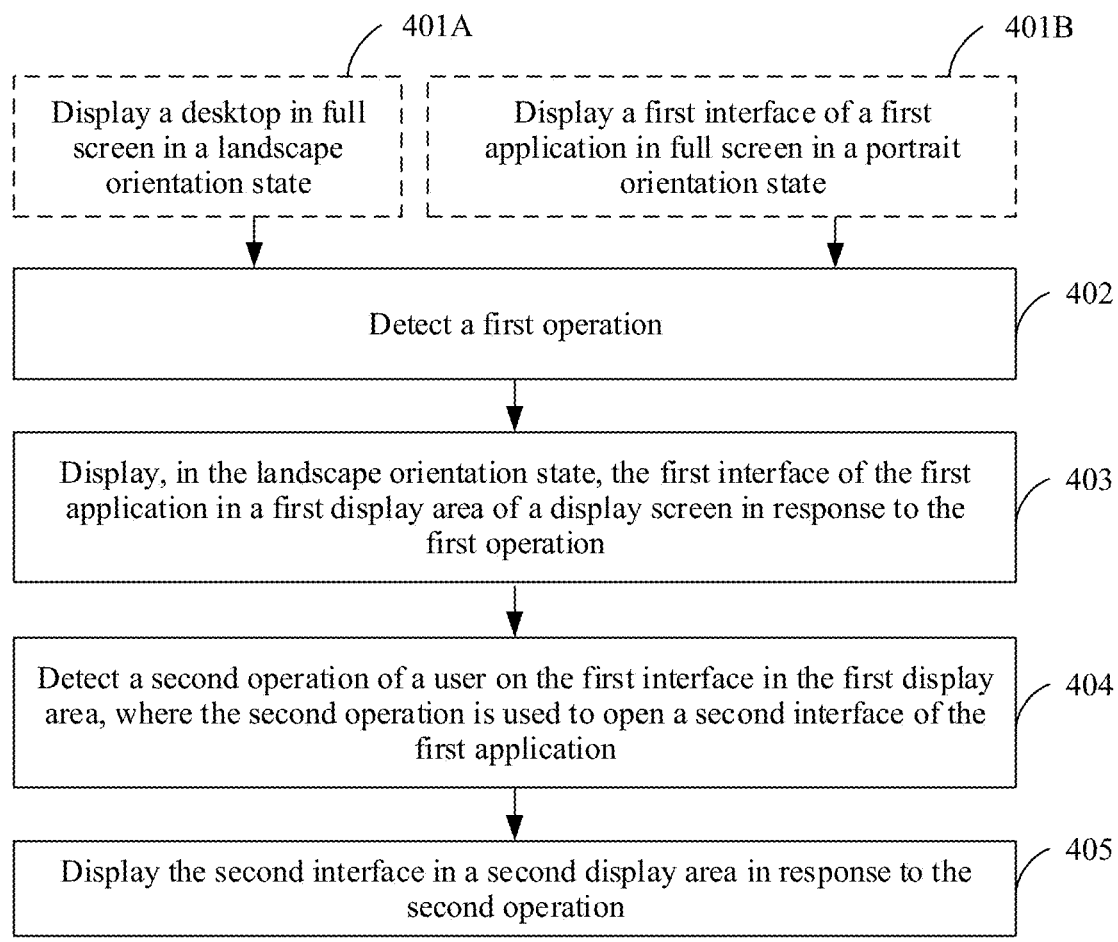
FIG. 4A is a flowchart of a display method according to an embodiment of this application.

Referring to FIG. 4A, a display method provided in an embodiment of this application may include the following steps.

401A. The tablet displays a desktop in full screen in the landscape orientation state.

Figure 5A:
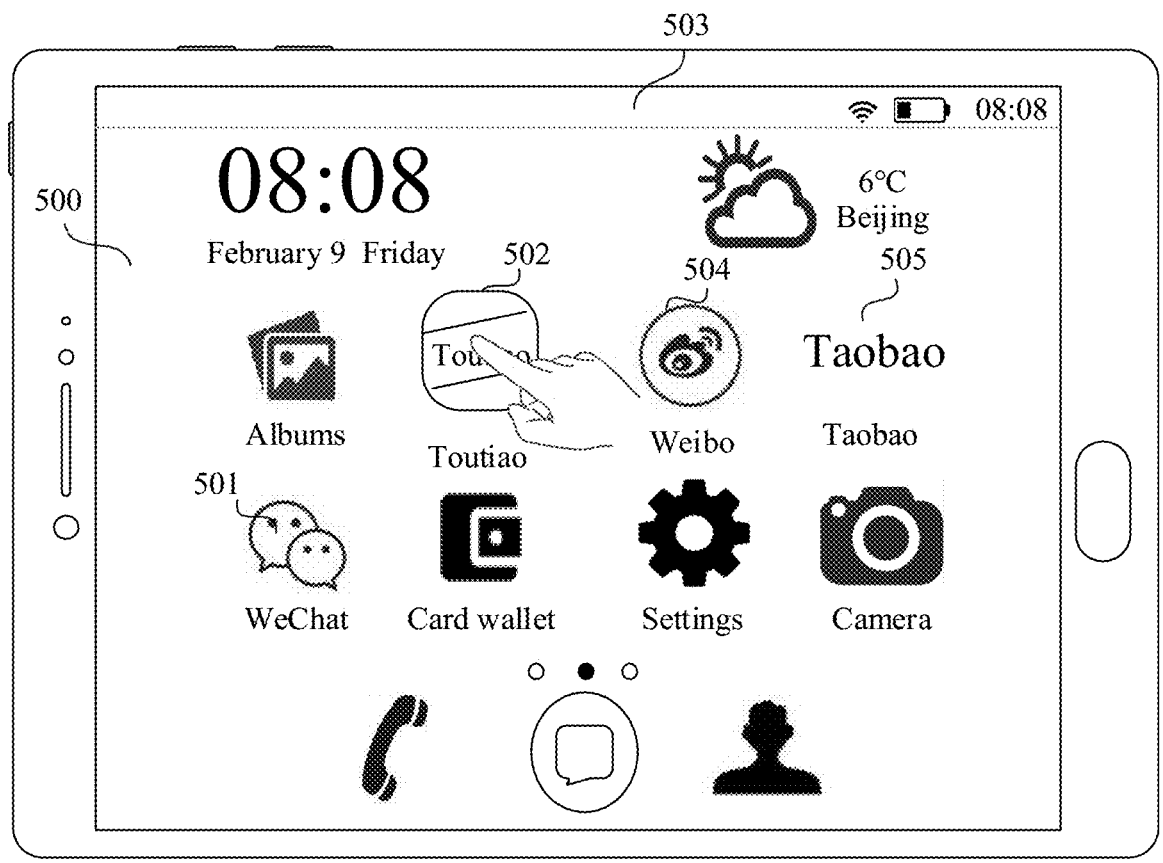
FIG. 5A is a schematic diagram of an interface of an electronic device according to an embodiment of this application.

When the tablet is in the landscape orientation state, a horizontal length of the display screen of the tablet is greater than a vertical length of the display screen, and the display screen is horizontal bar-shaped. Referring to FIG. 5A, the tablet may display a desktop 500 in full screen in a landscape orientation state.

As shown in FIG. 5A, the desktop 500 may include a status bar 503 and time and weather widgets, and may further include icons of a plurality of application programs, such as an icon 502 of Toutiao, an icon 505 of Taobao, an icon 502 of Weibo, and an icon 501 of WeChat. The status bar 503 may include time, a signal strength (for example, a Wi-Fi icon), a current battery level, and the like. In addition, it can be understood that in some other embodiments, the status bar 503 may further include a Bluetooth icon, an alarm clock icon, an external device icon, and the like. It can also be understood that in some other embodiments, the desktop 500 may further include a dockbar, and the dockbar may include icons of common application programs (application, App), and the like.

402. The tablet detects a first operation.

The first operation is an operation in which a user indicates to start a first application. The first operation may be a gesture operation of the user on the desktop, or may be a voice operation of the user. The gesture operation may be a touch gesture operation or an air gesture operation. The touch gesture operation may be an operation such as tap, double tap, touch and hold, or heavy press (that is, a strength of press is relatively great).

For example, the first application is a Toutiao application (a news type application), and the first operation may be an operation of the user for tapping the icon 502 of Toutiao on the desktop, or the first operation may be an operation of the user for starting the Toutiao application by using a voice instruction.

403. The tablet displays, in the landscape orientation state, a first interface of the first application in the first display area of the display screen in response to the first operation.

An aspect ratio of the first display area differs slightly from a preset ratio. For example, an absolute value of a difference between the aspect ratio of the first display area and the preset ratio is less than or equal to a preset value 2. In other words, the aspect ratio of the first display area falls within a range [the preset ratio–the preset value 2, the preset ratio+the preset value 2]. The preset value 2 may be relatively small, for example, may be 0.7. A specific value of the preset value 2 may be set depending on a requirement of an actual application scenario. The preset value 2 may be set by the user, or may be set by a system by default. For example, the preset ratio may be a conventional aspect ratio of a display screen such as 16:9, 16:8, or 18:9 when a mobile phone is in a portrait mode, or the preset ratio may be a conventional aspect ratio of a display screen such as 16:10 when a tablet is in a portrait mode.

When an aspect ratio of the display screen is the preset ratio, the tablet can normally display an interface of an application in an entire display area of the display screen. When the absolute value of the difference between the aspect ratio of the first display area and the preset ratio is less than or equal to the preset value 2, that is, when the aspect ratio of the first display area differs slightly from the preset ratio, the tablet can also normally display an interface of an application in the first display area. In other words, the tablet can normally display the first interface of the first application in the first display area of the display screen in response to the operation in which the user indicates to start the first application.

Figure 5B:
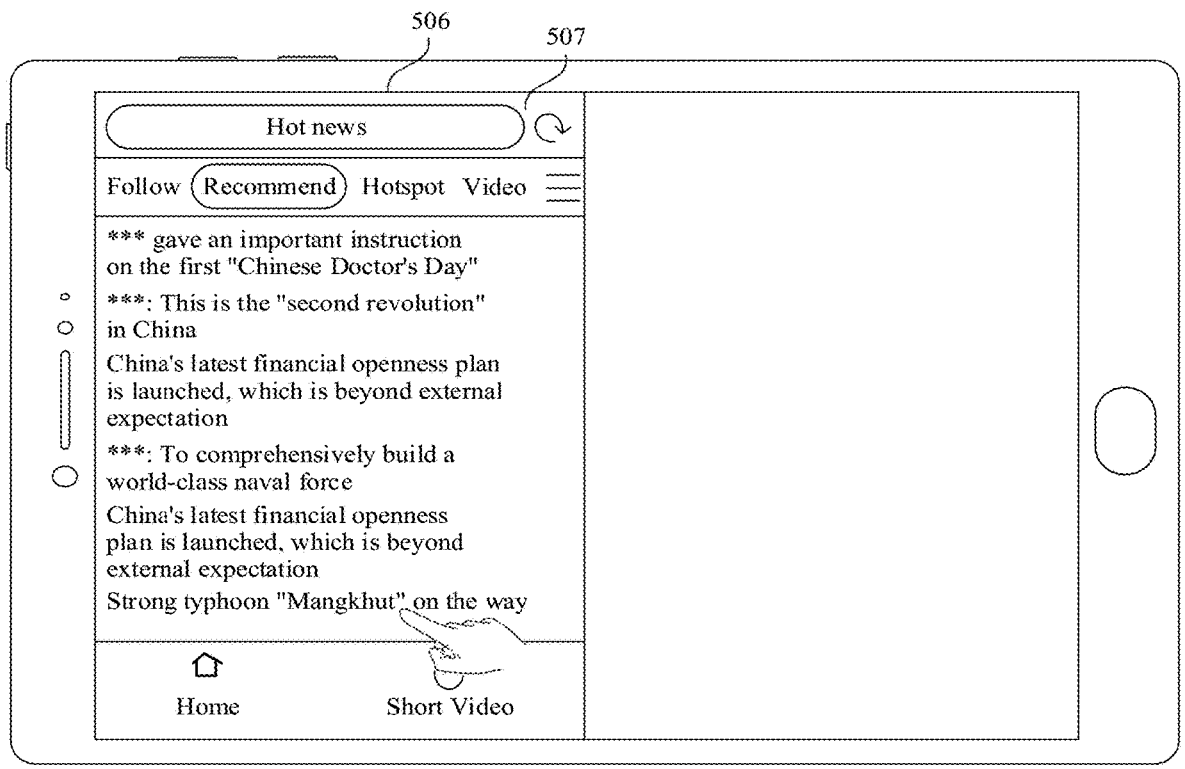
FIG. 5B is another schematic diagram of an interface of an electronic device according to an embodiment of this application.

For example, referring to FIG. 5B, the tablet may display a first interface 507 in a first display area 506 of the display screen in response to the operation of the user for tapping the icon 502 of Toutiao in FIG. 5A.

Optionally, the first interface may be a home page of the first application. In other words, the tablet normally displays the home page of the first application in the first display area in response to the operation of the user for starting the first application. For example, the first interface 507 shown in FIG. 5B is a home page of Toutiao (application).

Optionally, that the tablet displays the home page of the first application in the first display area in response to the operation of the user for starting the first application includes: After displaying an advertising page of the first application in the first display area, the tablet displays the home page of the first application in the first display area. For example, the tablet displays the advertising page of the first application in the first display area; and after display duration of the advertising page is greater than or equal to preset duration, the tablet stops displaying the advertising page, and displays the home page of the first application in the first display area. Alternatively, the tablet displays the advertising page of the first application in the first display area; and after detecting an operation in which the user indicates to skip the advertising page, the tablet stops displaying the advertising page, and displays the home page of the first application in the first display area.

When the tablet displays, in the landscape orientation state, the first interface of the first application in the first display area of the display screen in response to the first operation, the tablet does not display an interface of the first application in the second display area. Specifically, a pattern (for example, a wallpaper pattern) may be displayed in the second display area; a desktop background may be displayed in the second display area, that is, a part of the desktop background is presented in the second display area; or the second display area may be blank.

404. The tablet detects a second operation of the user on the first interface in the first display area, where the second operation is used to open a second interface of the first application.

The second operation is a touch operation of the user on the first interface in the first display area, and the second operation is used to indicate to open the second interface of the first application. For example, the second operation may be an operation of the user for tapping a piece of information (for example, tapping "Strong typhoon 'Mangkhut' on the way") on the home page of Toutiao shown in FIG. 5B.

405. The tablet displays the second interface in the second display area in response to the second operation.

An aspect ratio of the second display area differs slightly from a preset ratio. For example, an absolute value of a difference between the aspect ratio of the second display area and the preset ratio is less than or equal to the preset value 2. In other words, the aspect ratio of the second display area falls within a range [the preset ratio-the preset value 2, the preset ratio+the preset value 2]. In this way, the tablet can normally display the second interface of the first application in the second display area of the display screen.

Figure 5C:
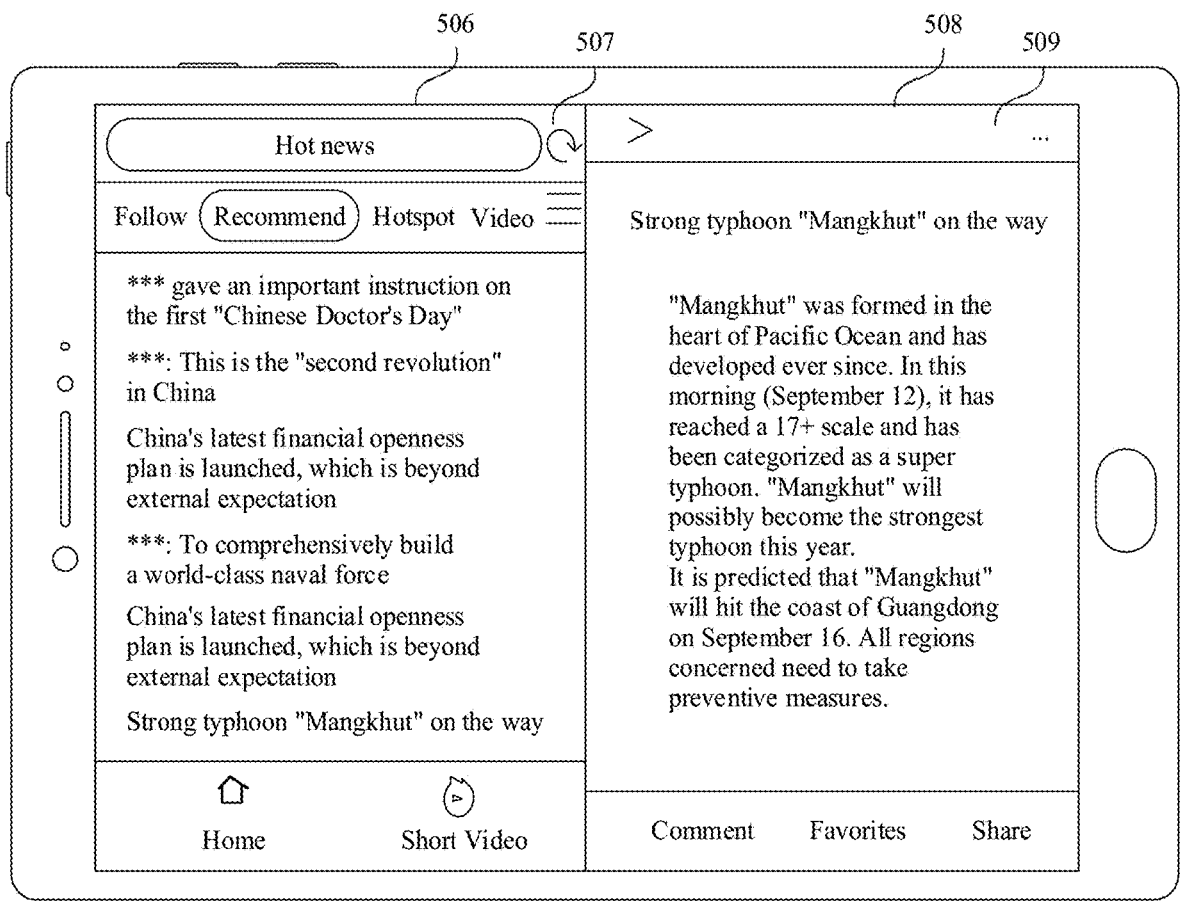
FIG. 5C is another schematic diagram of an interface of an electronic device according to an embodiment of this application.

For example, in response to the operation of the user for tapping the piece of information on the home page of Toutiao shown in FIG. 5B, the tablet may display a second interface 509 shown in FIG. 5C in a second display area 508, where the second interface 509 is a detail page of the information tapped by the user. In this case, content of the first display area 506 is basically unchanged. Alternatively, in the first display area 506, a display effect of content tapped by the user is changed. For example, one or more of a color, brightness, a contrast, a grayscale, a display form, or the like of the information content tapped by the user are changed, to indicate that the piece of information is currently opened or has been opened.

In another embodiment, before step 402, the method may further include step 401B used as an alternative step of step 401A.

401B. The tablet displays the first interface of the first application in full screen in the portrait orientation state.

Figure 5D:
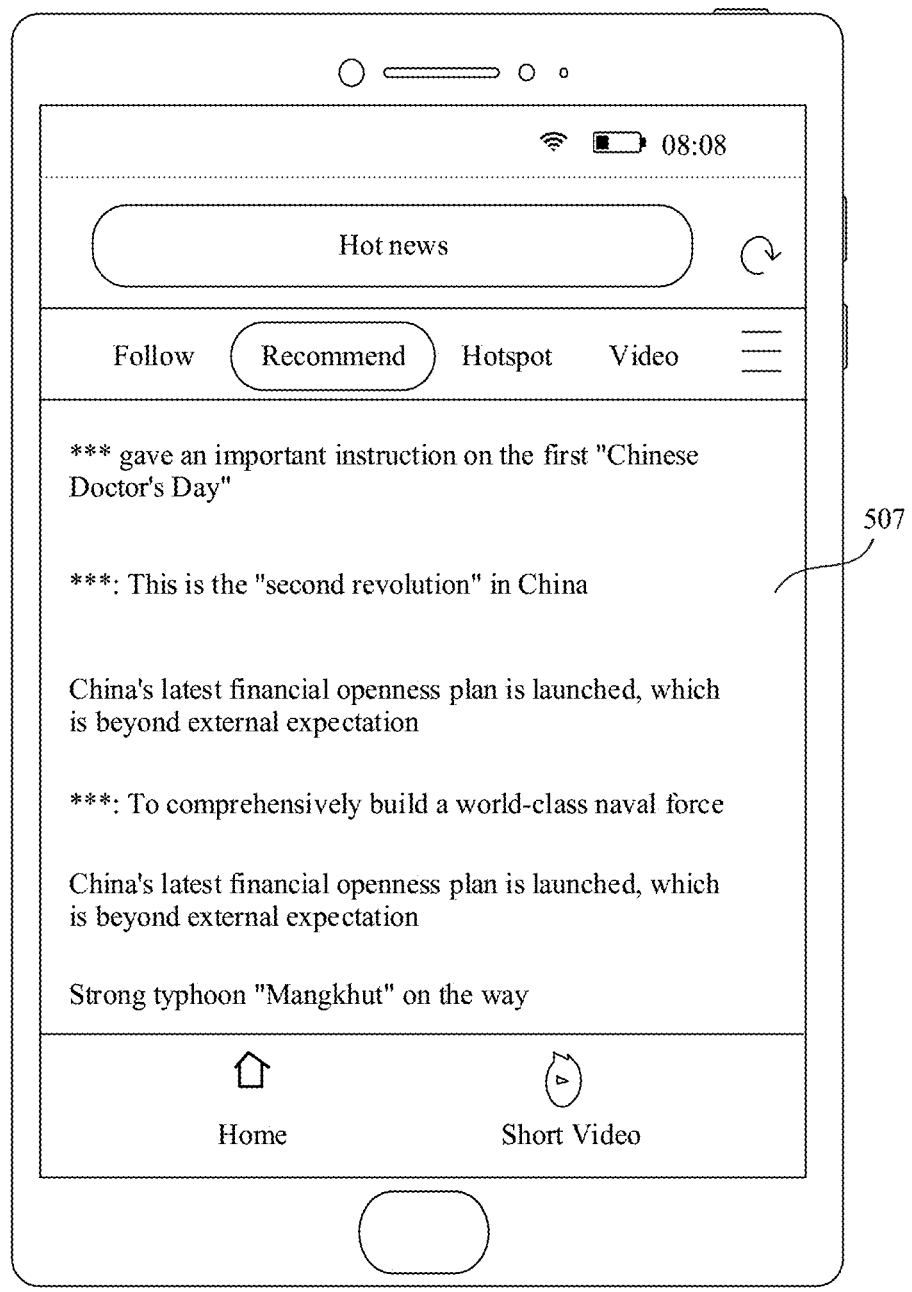
FIG. 5D is another schematic diagram of an interface of an electronic device according to an embodiment of this application.

Based on step 401B, the first operation in step 402 may be an operation of the user for switching the tablet from the portrait orientation state to the landscape orientation state. In other words, the tablet has opened the first interface of the first application in the portrait orientation state. For example, the first application is the Toutiao application. For a schematic diagram of displaying the first interface of the first application in full screen in the portrait orientation state, refer to FIG. 5D. Then, in response to the operation of the user for switching the tablet from the portrait orientation state to the landscape orientation state (for example, an operation in which the user rotates the tablet to switch from a state shown in FIG. 5D to the state shown in (a) in FIG. 1), the tablet displays the first interface in the first display area of the display screen in the landscape orientation state in step 403, as shown in FIG. 5B.

It can be learnt that the tablet can normally display different interfaces of the first application in the first display area and the second display area in the landscape orientation state. In addition, the tablet displays a plurality of interfaces of the first application in a plurality of display areas in the landscape orientation state. In this way, a feature of a long horizontal length of the tablet in the landscape orientation state can be fully utilized to display the plurality of interfaces to the user on the display screen, so as to provide a larger amount of information for the user.

In this embodiment of this application, in the landscape orientation state, the display screen of the tablet may include a plurality of display areas, where aspect ratios of the display areas differ slightly from the preset ratio. Because the tablet can normally display an interface of an application on the display screen whose aspect ratio is the preset ratio, the tablet can also normally display an interface of an application in a display area whose aspect ratio differs slightly from the preset ratio. Therefore, in the landscape orientation state, the tablet can normally display an interface of an application in a display area divided from the display screen.

Optionally, when the user faces the display screen, the first display area of the display screen is located on the left of the second display area of the display screen. In other words, the tablet displays, on the left side, the first interface (for example, the home page of the first application) that is displayed after the first application is started. This can better conform to a use habit of the user.

Optionally, when the user faces the display screen, the first display area of the display screen is located on the right of the second display area of the display screen. In other words, the tablet displays, on the right side, the first interface (for example, the home page of the first application) that is displayed after the first application is started.

It should be noted that the preset ratio may include at least one ratio, and a difference between an aspect ratio of each display area of the display screen and any one of the preset ratio is less than or equal to the preset value 2.

Figure 6:
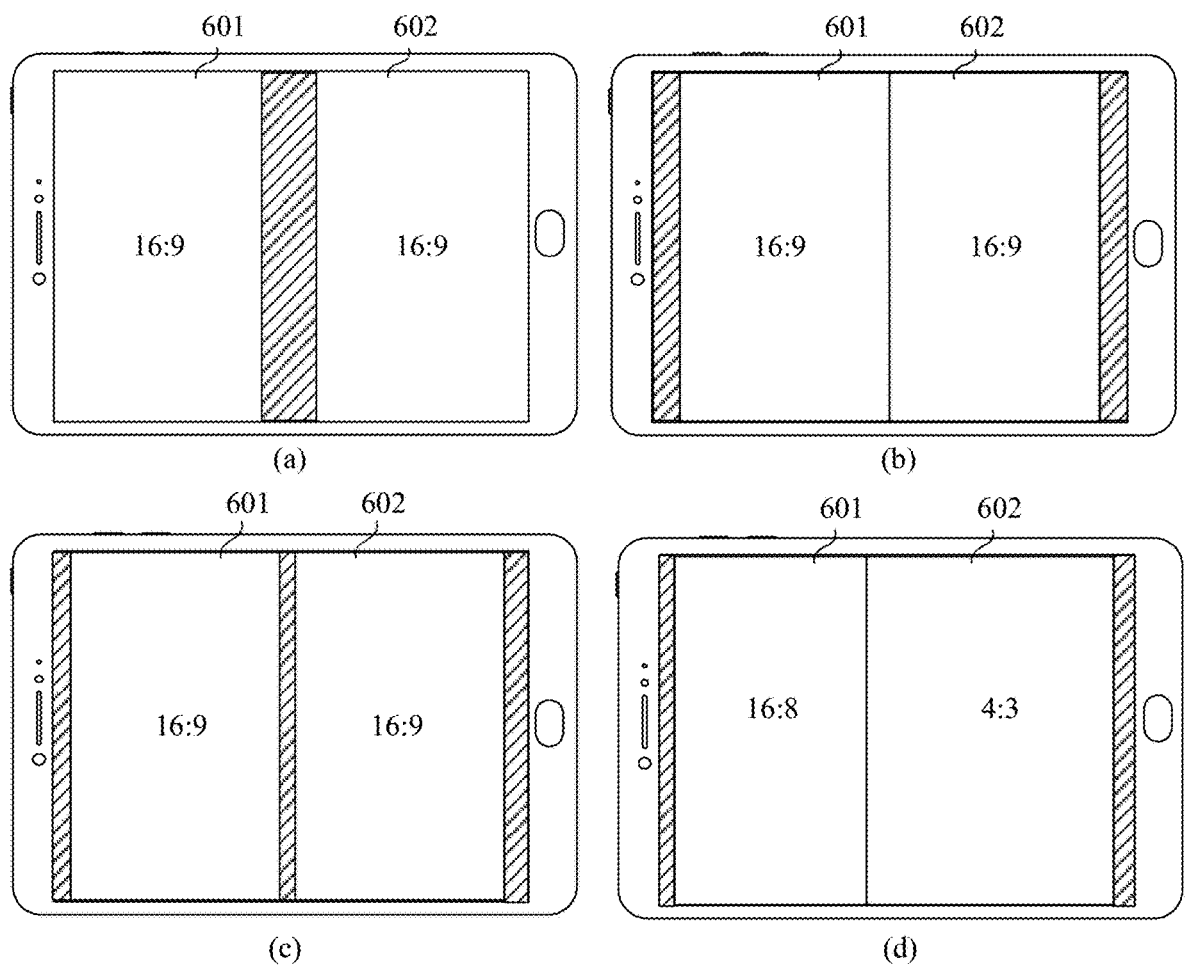
FIG. 6 is a group of schematic diagrams illustrating division of display areas according to an embodiment of this application.

In this embodiment of this application, in the landscape orientation state, aspect ratios and sizes of different display areas included in the display screen may be identical or different. For example, preset ratios include 16:9 and 16:8. Referring to (a), (b), or (c) in FIG. 6, an aspect ratio and a size of a first display area 601 are the same as those of a second display area 602, both the aspect ratios of the first display area 601 and the second display area 602 are 16:9, and a difference between the aspect ratio and the preset ratio 16:9 is 0. It should be noted that, when the first display area 601 and the second display area 602 cannot fully occupy the display screen, referring to (a) in FIG. 6, space may be left between the first display area 601 and the second display area 602; or referring to (b) in FIG. 6, space may be left on two sides of the first display area 601 and the second display area 602; or referring to (c) in FIG. 6, space may be left between the first display area 601 and the second display area 602 and on two sides of the first display area 601 and the second display area 602. In FIG. 6, parts filled with oblique lines represent space between the display areas.

In some embodiments, for an aesthetic purpose, a pattern (for example, a wallpaper pattern) may be displayed in the space beside the display areas; or a desktop background may be displayed in the space, that is, a part of the desktop background is presented in the space.

For another example, preset ratios include 16:9 and 16:8. Referring to (d) in FIG. 6, an aspect ratio and a size of a first display area 601 are different from those of a second display area 602, the aspect ratio of the first display area 601 is 16:8, and a difference between the aspect ratio and the preset ratio 16:8 is 0 and the different is less than the preset value 2; the aspect ratio of the second display area 602 is 4:3, and a difference between the aspect ratio and the preset ratio 16:9 is less than the preset value 2; vertical lengths of the first display area 601 and the second display area 602 are equal, and horizontal lengths of the first display area 601 and the second display area 602 are unequal.

For aesthetic and neat purposes, and to fully utilize the vertical length of the display screen, the vertical lengths of the first display area and the second display area are equal to the vertical length of the display screen of the tablet in the landscape orientation state. In this way, display heights of different interfaces of the first application are the same when the different interfaces are displayed in the first display area and the second display area.

It can be understood that the vertical lengths of the first display area and the second display area may alternatively be less than the vertical length of the display screen in the landscape orientation state.

In some embodiments, the plurality of display areas included in the display screen when the tablet is in the landscape orientation state may be preset. For example, the preset ratio is 16:9, the preset value 2 is 0.7, the aspect ratio of the display screen is 10:16 when the tablet is in a landscape mode, the display screen includes the first display area and the second display area, and aspect ratios of the first display area and the second display area both 16:12 (that is, 4:3). In this case, an absolute value of a difference between 16:12 and the preset ratio 16:9 is less than the preset value 2.

Figure 7:
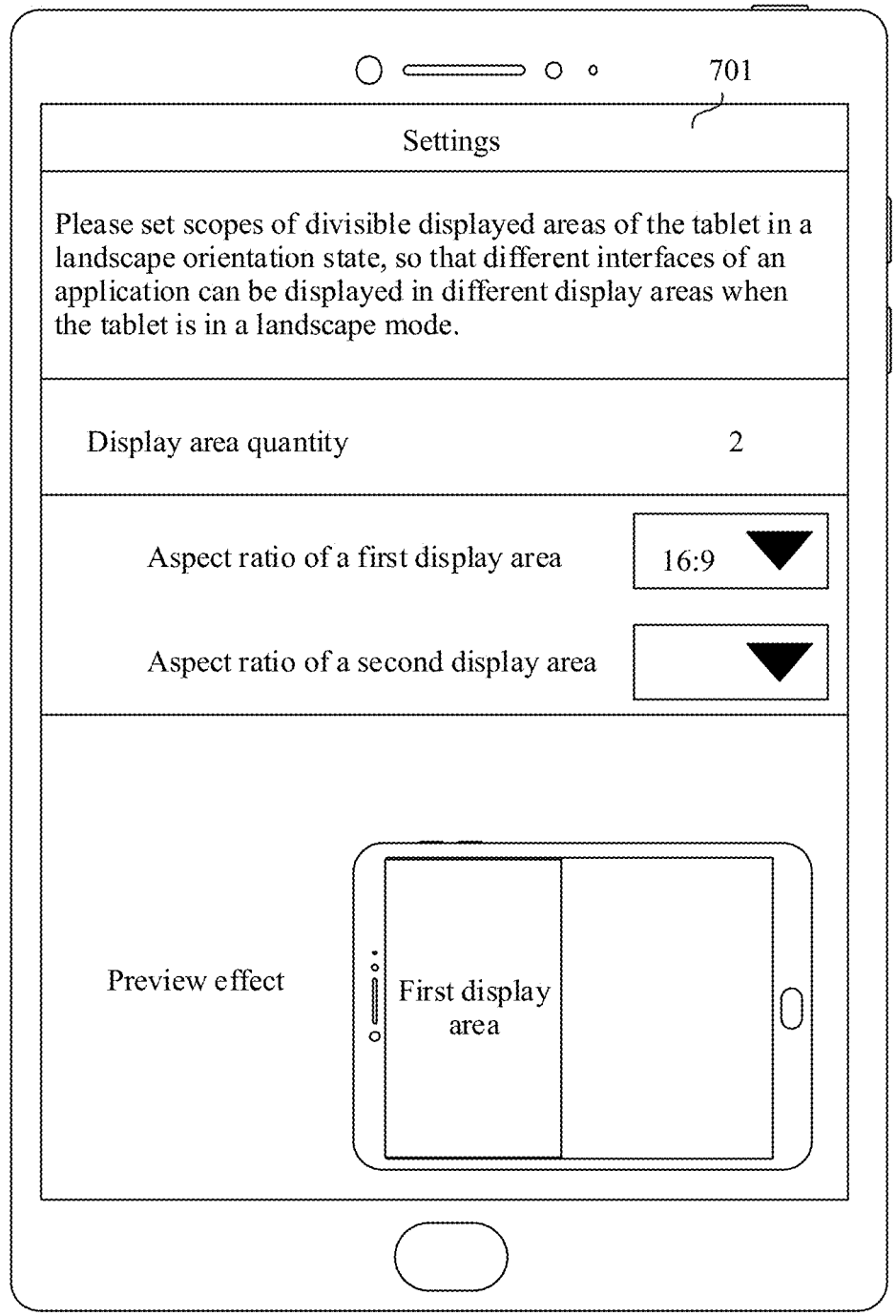
FIG. 7 is a schematic diagram of a setting interface according to an embodiment of this application.
Figure 8A:
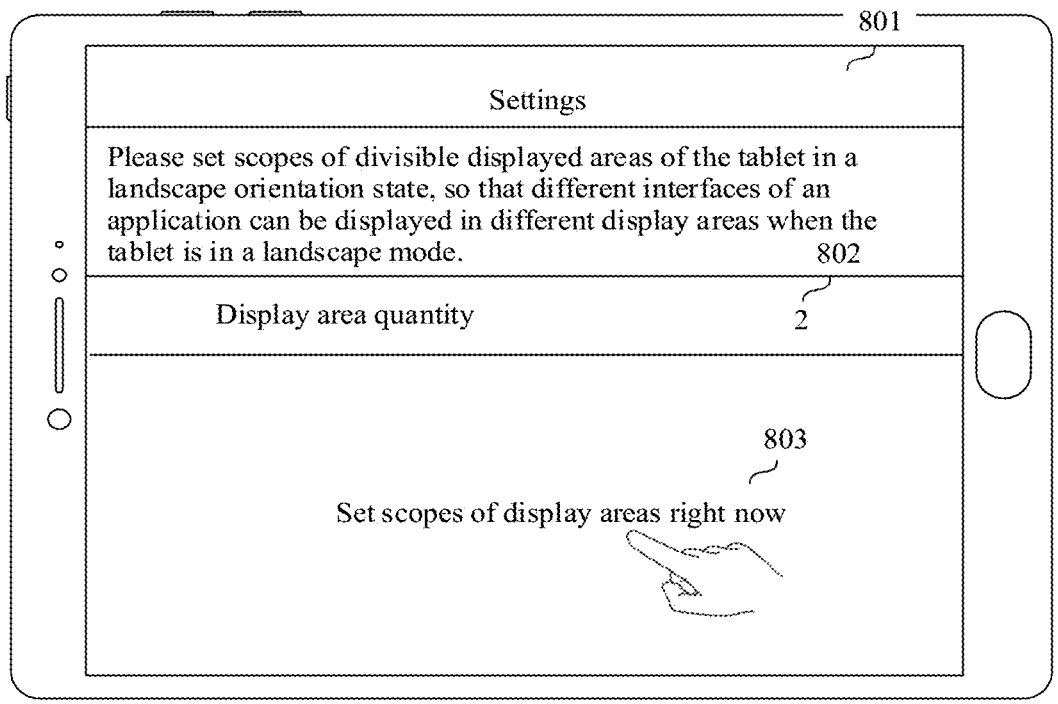
FIG. 8(a) to FIG. 8(d) are schematic diagrams of a group of setting interfaces according to an embodiment of this application.
Figure 8B:
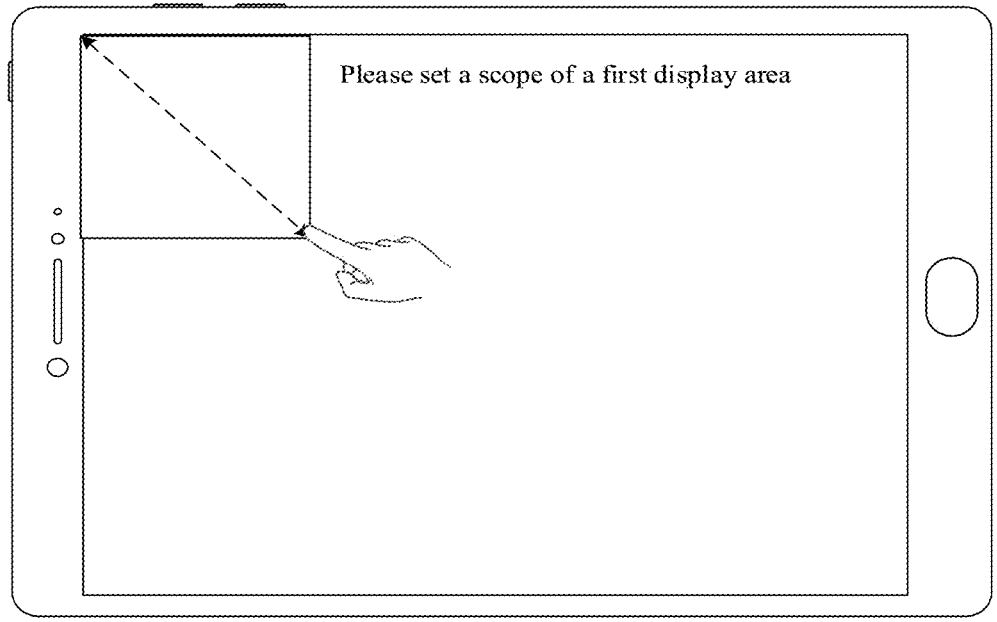
Figure 8C:
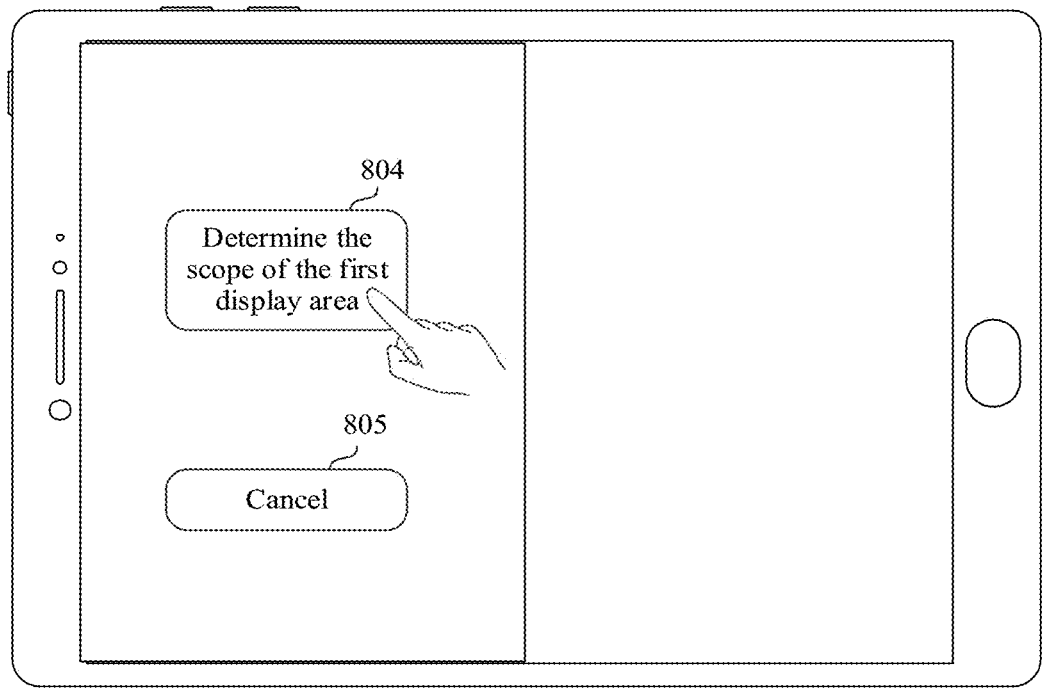
Figure 8D:
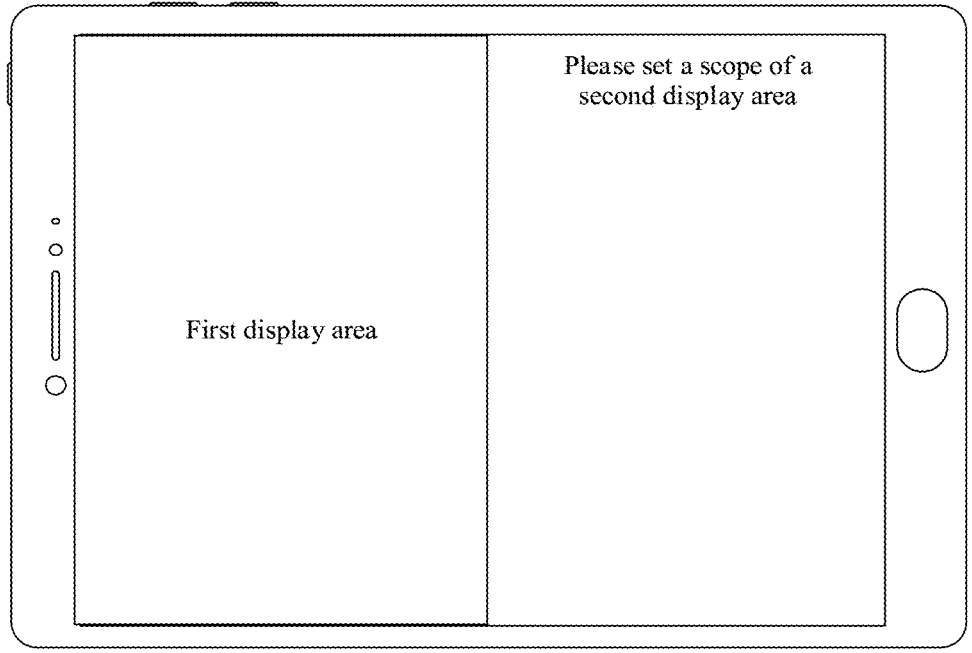

In some other embodiments, the plurality of display areas included in the display screen when the tablet is in the landscape orientation state may be set by the user. For example, as shown in FIG. 7, a display area setting control is displayed on a setting interface 701 (the setting interface may be displayed in the portrait orientation state or may be displayed in the landscape orientation state) of the tablet. The user may set the aspect ratio of the first display area and the aspect ratio of the second display area, or the user may select the aspect ratio of the first display area and the aspect ratio of the second display area from the setting interface.

For another example, as shown in FIG. 8(*a*), a display area quantity setting control 802 and a display area scope setting control 803 in the landscape orientation state are displayed on a setting interface 801 of the tablet. After the user sets a display area quantity to 2 and taps the control 803, as shown in FIG. 8(*b*), the tablet may prompt the user to set a scope of the first display area. The user may perform a drag operation on the display screen to set the scope of the first display area. After the user stops the drag operation, as shown in FIG. 8(*c*), the tablet may display a control 804 for determining the scope of the first display area and a control 805 for setting cancelation. After the user taps the control 804, referring to FIG. 8(*d*), the tablet may prompt the user to set a scope of the second display area.

Figure 9:
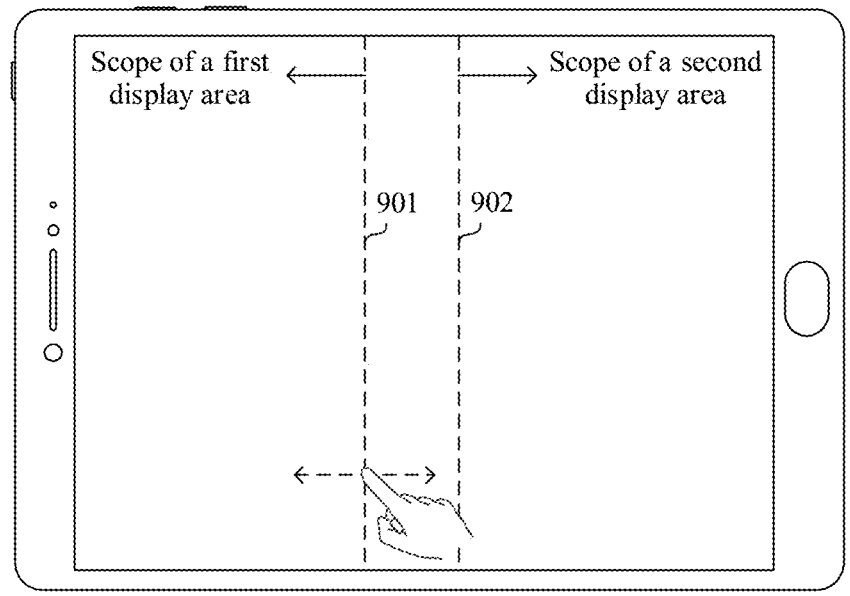
FIG. 9 is a schematic diagram of another setting interface according to an embodiment of this application.

For still another example, after the user sets the display area quantity to 2 on the setting interface 801 and taps the control 803, as shown in FIG. 9, a first boundary 901 and a second boundary 902 are displayed on a setting interface of the tablet. The user may drag the first boundary to set a size and an aspect ratio of the first display area, and drag the second boundary to set a size and an aspect ratio of the second display area. When the absolute value of the difference between the aspect ratio of the first display area and the preset ratio is greater than the preset value 2, the tablet may notify the user that a horizontal length of the first display area is excessively wide or narrow, so that the aspect ratio of the first display area that is set by the user differs slightly from the preset ratio. Likewise, when the absolute value of the difference between the aspect ratio of the second display area and the preset ratio is greater than the preset value 2, the tablet may notify the user that a horizontal length of the second display area is excessively wide or narrow, so that the aspect ratio of the second display area that is set by the user differs slightly from the preset ratio.

For yet another example, as an alternative solution of FIG. 9, a first boundary, a second boundary, a third boundary, and a fourth boundary are displayed on a setting interface of the tablet. The user may drag the first boundary and the second boundary to set a size and an aspect ratio of the first display area, and drag the third boundary and the fourth boundary to set a size and an aspect ratio of the second display area.

Certainly, the user may alternatively set the display areas included in the display screen in the landscape orientation state in another manner. This is not limited in this embodiment of this application.

In this embodiment of this application, different interfaces of one application may have a higher level and a lower level. The tablet may display a to-be-displayed interface in a display area of the display screen based on a level relationship between a to-be-displayed interface and a displayed interface.

For example, different interfaces of one application may correspond to a same activity (Activity), or may correspond to different activities. When different interfaces correspond to a same activity, these interfaces may correspond to a same level. When different interfaces correspond to different activities, these interfaces correspond to different levels. In response to an operation of the user on an interface, the interface may be used to call another interface. When the calling interface and the called interface correspond to a same activity, the calling interface and the called interface may correspond to a same level. When the calling interface and the called interface correspond to different activities, the called interface is at a level lower than the calling interface.

For example, the calling interface may be an interface 507 in FIG. 5C, the called interface may be the interface 509 in FIG. 5C, the interface 509 and the interface 507 correspond to different activities, and the interface 509 is at a level lower than the interface 507.

In a technical solution, a process of performing calling between interfaces by the tablet may be implemented by using a first-in last-out stack. For example, when the tablet calls and displays an interface 1, the interface 1 is pushed into the stack; when the interface 1 is used to call an interface 2, the interface 2 is pushed into the stack; and when the user makes the current interface 2 return to the interface 1, the current interface 2 is popped from the stack. In addition, when detecting a return operation of the user on a current interface (for example, an operation of the user for tapping a return control on the current interface), the tablet returns, in response to the operation, to an interface that is used to proactively call the current interface previously.

For another example, the tablet presets a level relationship between different activities, where a higher-level activity corresponds to a higher-level interface, and a lower-level activity corresponds to a lower-level interface. For example, in the Toutiao application, activity levels corresponding to "follow", "recommend", "hotspot", "video", and "toutiaohao" information list interfaces are higher than an activity level corresponding to an information detail page (the detail page is an interface), and levels of the "follow", "recommend", "hotspot", "video", and "toutiaohao" information list interfaces are also higher than a level of the information detail page.

Based on the level relationship between interfaces, after step 404, step 405 may specifically include: If the second interface is an interface at a level lower than the first interface, the tablet displays the second interface in the second display area. In other words, the tablet displays, in the second display area, the interface at a level lower than the first interface. For example, when the user taps a piece of information (for example, taps "Strong typhoon 'Mangkhut' on the way") on the home page of Toutiao shown in FIG. 5B, a level of a detail page of the piece of information is lower than that of the home page of Toutiao. The tablet displays the detail page of the piece of information in the second display area. Alternatively, after step 404, the method may further include: If the second interface and the first interface correspond to a same level, the tablet displays the second interface in the first display area. In other words, the tablet displays, in the first display area, the interface at the same level as the first interface. For example, when the user taps "hotspot" in FIG. 5B, the tablet displays a "hotspot" interface in the first display area.

Based on the level relationship between interfaces, after step 405 is performed, when the tablet receives again an operation of the user for opening, on the first interface, another interface of the first application, the tablet may display a to-be-displayed interface in a display area of the display screen based on the level relationship between a to-be-displayed interface and a displayed interface.

Figure 4B:
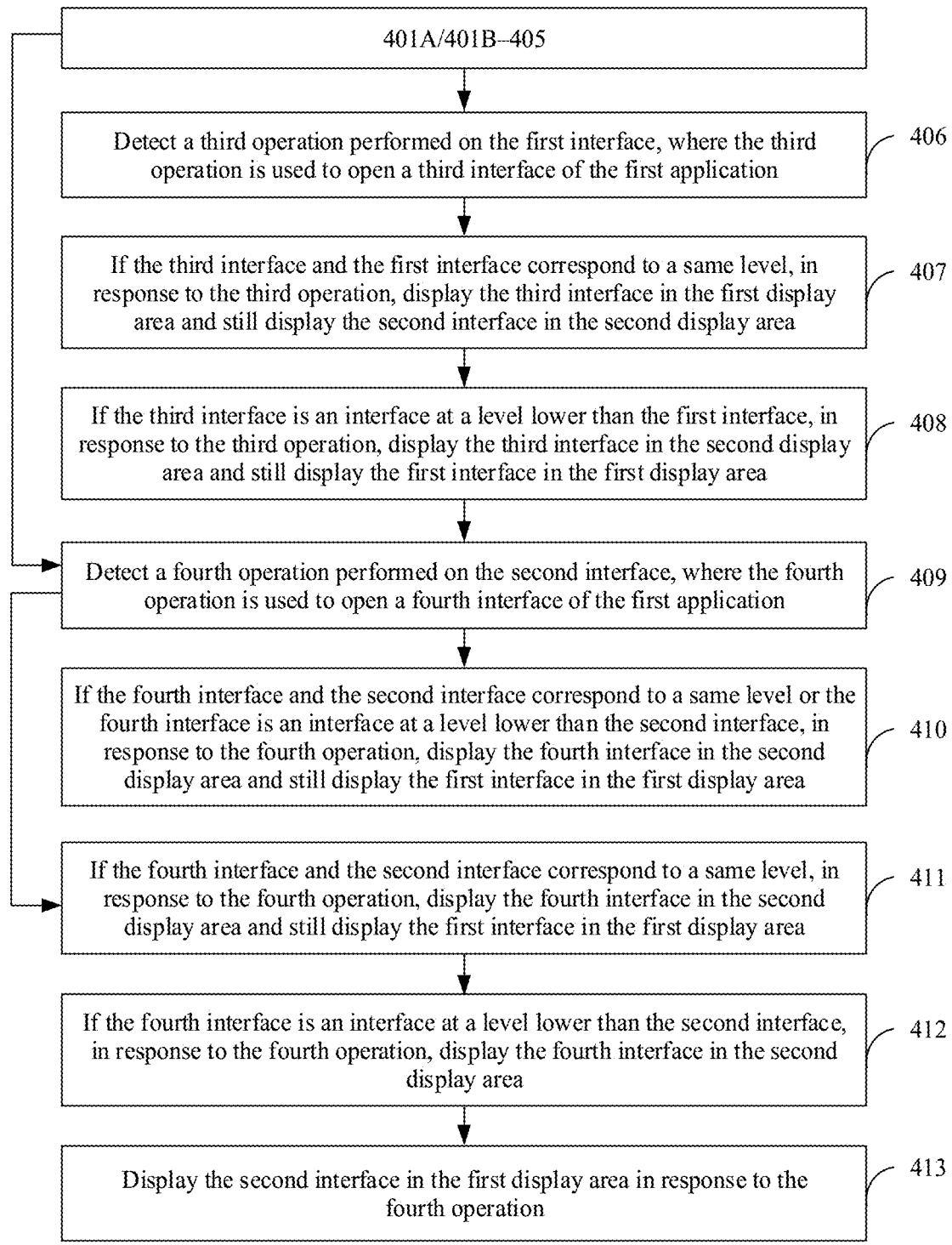
FIG. 4B is a flowchart of another display method according to an embodiment of this application.

For example, after step 405 is performed, the tablet displays, in the first display area, another interface that is of the first application and that corresponds to a same level as the first interface of the first application, and displays an interface at a level lower than the first interface in the second display area. Specifically, referring to FIG. 4B, after step 405, the method may further include the following steps.

406. The tablet detects a third operation performed on the first interface, where the third operation is used to open a third interface of the first application.

407. If the third interface and the first interface correspond to a same level, in response to the third operation, the tablet displays the third interface in the first display area and still displays the second interface in the second display area.

Figure 10A:
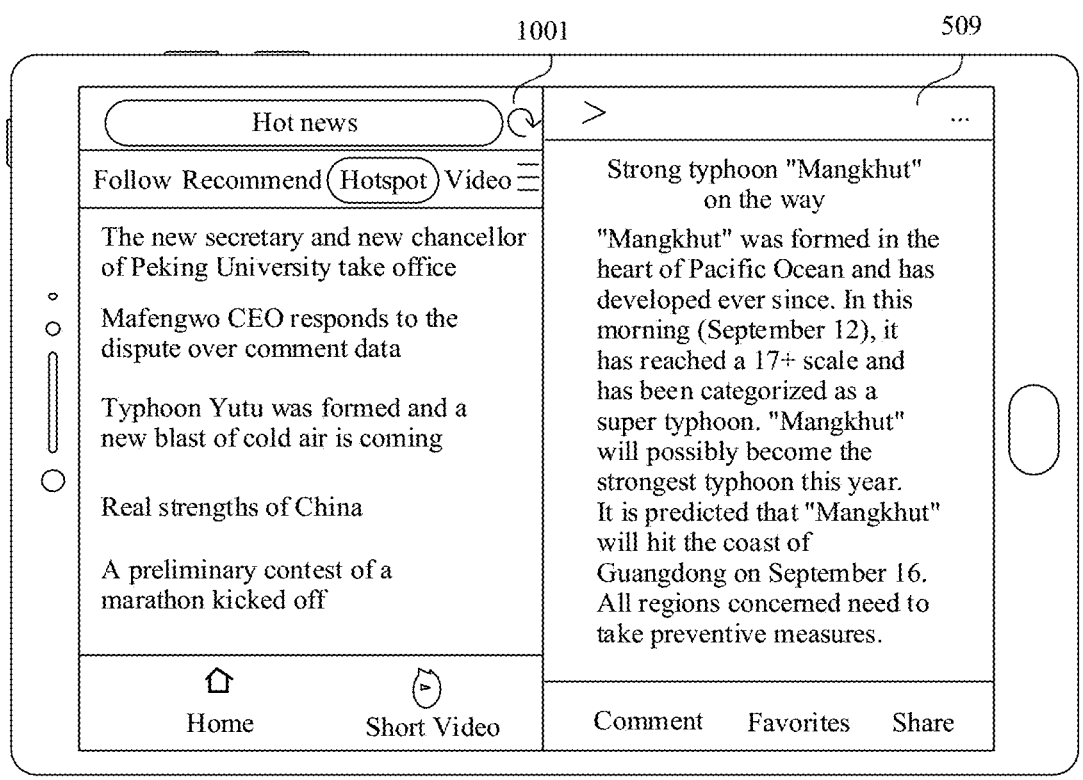
FIG. 10A is another schematic diagram of an interface of an electronic device according to an embodiment of this application.

For example, based on FIG. 5C, the first interface in the first display area is the interface 507, the interface in the second display area is the interface 509, the third operation may be an operation of the user for tapping a "hotspot" control on the first interface 507 in FIG. 5C, and the third interface may be a "hotspot" information list interface. The "hotspot" information list interface and the interface 507 correspond to a same activity and are at a same level. In this case, referring to FIG. 10A, the tablet may update the interface 507 (that is, the first interface) to a "hotspot" information list interface 1001 in the first display area and still display the interface 509 (that is, the second interface) in the second display area.

In some embodiments, one activity may correspond to one window, and different interfaces corresponding to the activity may be referred to as sub-windows or fragments (fragment) of the window.

408. If the third interface is an interface at a level lower than the first interface, in response to the third operation, the tablet displays the third interface in the second display area and still displays the first interface in the first display area.

For example, based on FIG. 5C, the first interface in the first display area is the interface 507, the interface in the second display area is the interface 509, the third operation may be an operation of the user for tapping another piece of information (for example, "* gave an important instruction on the first 'Chinese Doctor's Day'") on the interface 507 in FIG. 5C, and the third interface may be a detail page of "* gave an important instruction on the first 'Chinese Doctor's Day'" (the detail page is an interface). The detail page of "* gave an important instruction on the first 'Chinese Doctor's Day'" and the first interface 507 correspond to different activities and correspond to different levels, the interface 507 is used to call the detail page of "* gave an important instruction on the first 'Chinese Doctor's Day'", and the detail page of "* gave an important instruction on the first 'Chinese Doctor's Day'" is an interface at a level lower than the interface 507. In this case, referring to FIG. 10B, the tablet may display a detail page 1002 of "* gave an important instruction on the first 'Chinese Doctor's Day'" in the second display area and still display the interface 507 (that is, the first interface) in the first display area.

In the solution described in steps 401A/401B to 408, when the first interface is the home page of the first application, the first display area is used to display only the home page of the first application and a page at a same level as the home page, and the second display area is used to display another interface of the first application. This can be convenient for the user to frequently perform operations on the home page and the page at the same level as the home page, without a need to frequently call the home page or the page at the same level as the home page to perform an operation. In the display method, the first application may be a news information type application, for example, a Toutiao application, Sohu News, or Netease News; or may be an application that may include interfaces with two levels (or two activities), or the like.

Figure 10B:
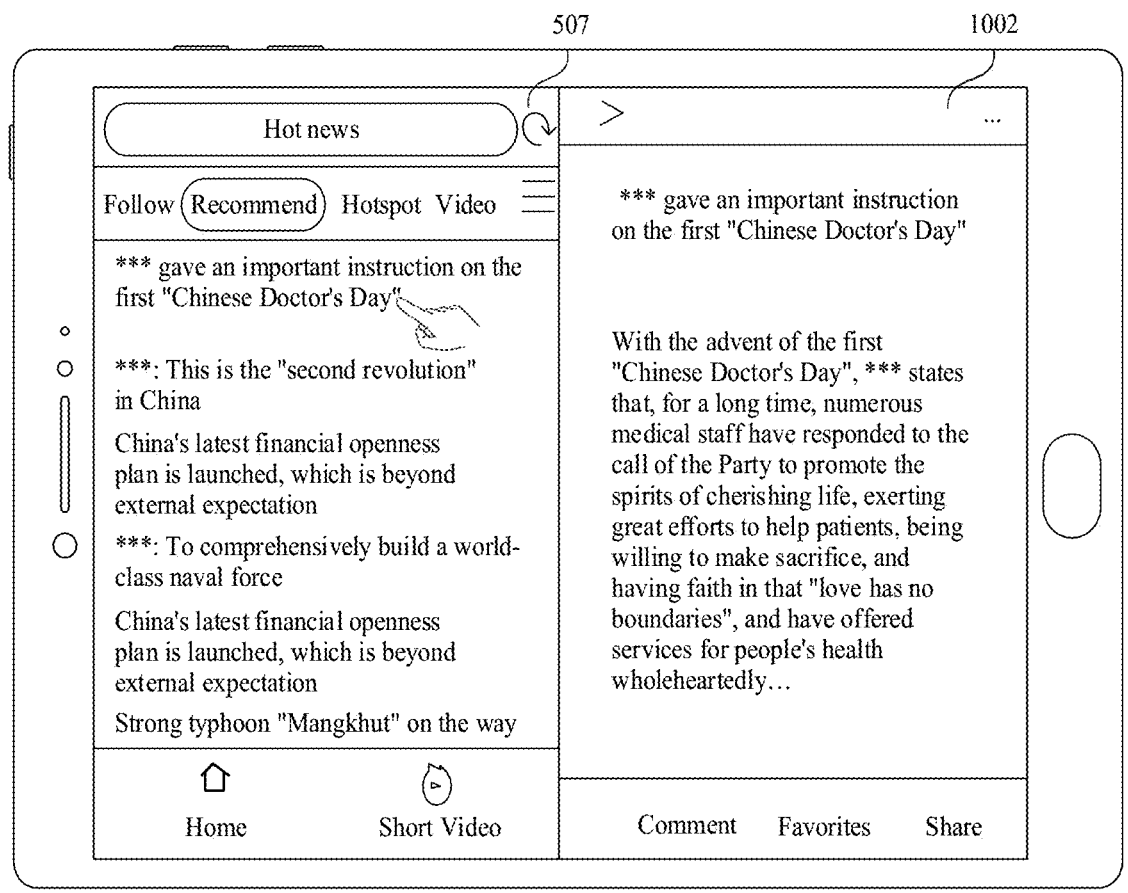
FIG. 10B is another schematic diagram of an interface of an electronic device according to an embodiment of this application.

For example, as shown in FIG. 5C and FIG. 10B, the first application is Toutiao, the first display area is located on the left of the second display area, and the first display area may be used to display the home page of Toutiao (for example, an interface displayed in the display area on the left side in FIG. 5C) or a page that is at a same level as the home page of Toutiao (for example, an interface that is displayed by the tablet after the user taps the "hotspot" control on the interface displayed in the left-side area in FIG. 5C). This is convenient for the user to frequently tap information on the home page of Toutiao or the page that is at the same level as the home page in the first display area, so as to view details of different information in the second display area.

In addition, if the third interface is an interface at a level higher than the first interface, in response to the third operation, the tablet displays the third interface in the first display area and displays the first interface in the second display area; or in response to the third operation, the tablet displays the third interface in the first display area and still displays the second interface in the second display area.

Based on the level relationship between interfaces, after step 405 or step 408 is performed, when the tablet receives again an operation of the user for opening, on the second interface, another interface of the first application, the tablet may display a to-be-displayed interface in a display area of the display screen based on the level relationship between a to-be-displayed interface and a displayed interface.

For example, after step 405 or step 408 is performed, when the tablet detects an operation that is performed by the user on the second interface and that is used to indicate to open a new interface of the first application, regardless of whether the new interface and the second interface correspond to a same level or the new interface is an interface at a level lower than the second interface, the tablet displays the new interface in the second display area in response to the operation. Specifically, after step 405 or step 408, the method may further include the following steps.

409. The tablet detects a fourth operation performed on the second interface, where the fourth operation is used to open a fourth interface of the first application.

410. If the fourth interface and the second interface correspond to a same level or the fourth interface is an interface at a level lower than the second interface, in response to the fourth operation, the tablet displays the fourth interface in the second display area and keeps the interface displayed in the first display area unchanged.

That the interface displayed in the first display area is unchanged means: If the first interface is displayed in the first display area before the tablet detects the fourth operation, when the fourth interface is displayed in the second display area in response to the fourth operation, the first interface is still displayed in the first display area; or if the third interface is displayed in the first display area before the tablet detects the fourth operation, when the fourth interface is displayed in the second display area in response to the fourth operation, the third interface is still displayed in the first display area.

Figure 11A:
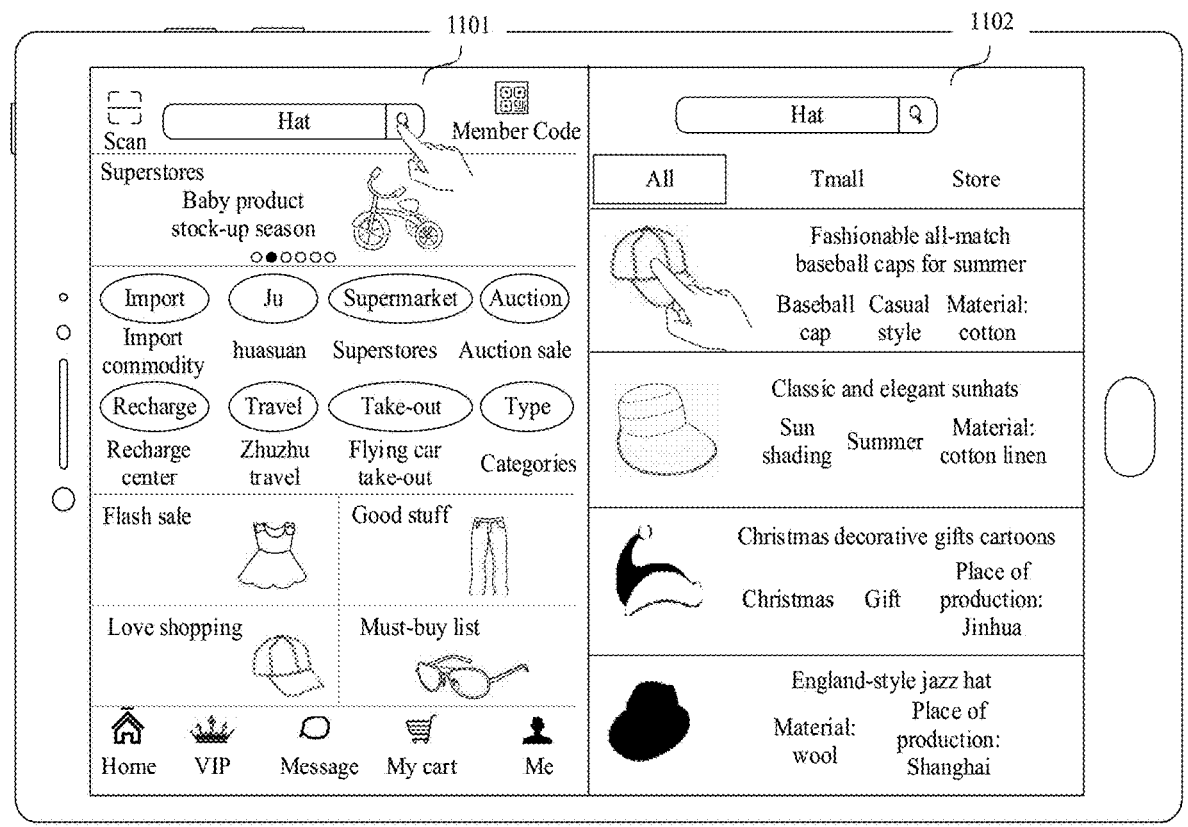
FIG. 11A is another schematic diagram of an interface of an electronic device according to an embodiment of this application.

For example, referring to FIG. 11A, the first interface may be a home page 1101 of Taobao, the second interface may be a hat list interface 1102 displayed after the user searches for a hat on the first interface, the first interface is displayed in the first display area, and the second interface is displayed in the second display area.

Figure 11B:
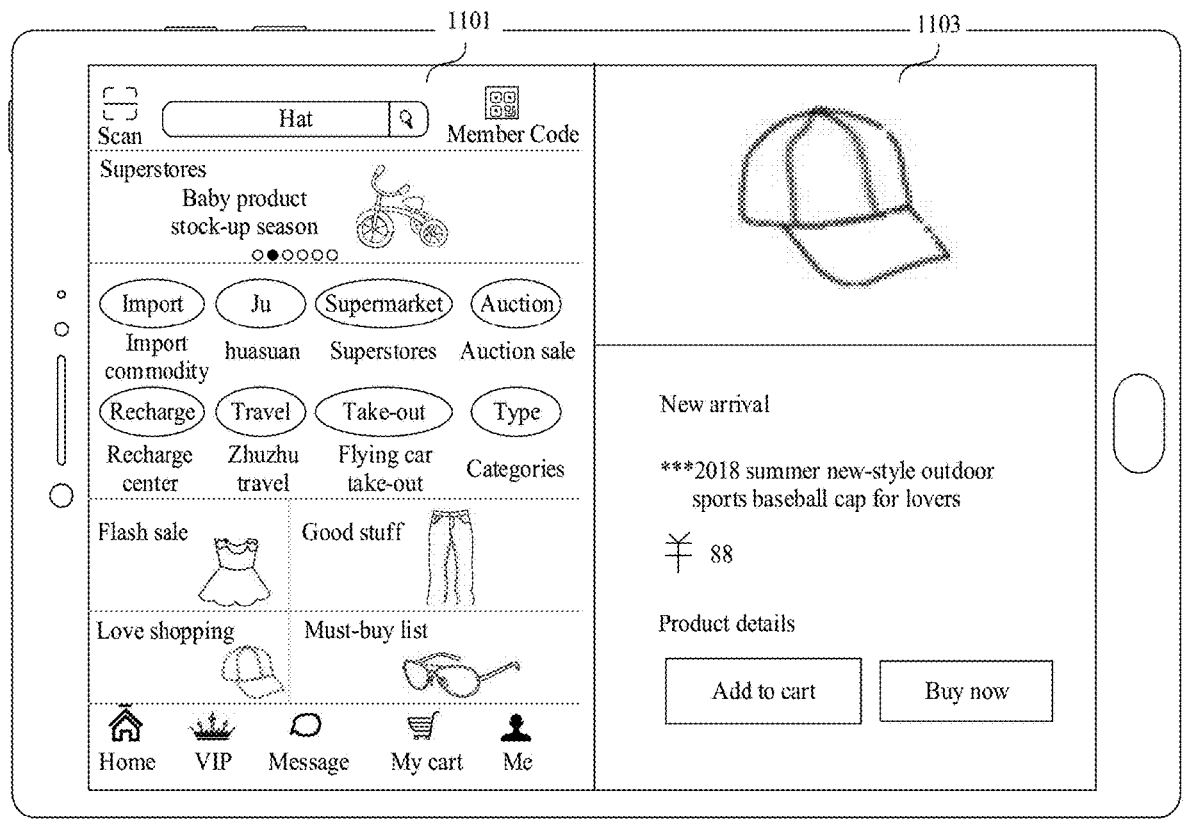
FIG. 11B is another schematic diagram of an interface of an electronic device according to an embodiment of this application.

Based on FIG. 11A, the fourth operation may be an operation of the user for tapping a hat link on the second interface in FIG. 11A, the fourth interface may be a detail page of the hat link (the detail page is an interface), and the detail page of the hat link is an interface at a level lower than the hat list interface 1102. In this case, referring to FIG. 11B, the tablet may display a detail page 1103 (that is, the fourth interface) of the hat link in the second display area and still display the home page 1101 (that is, the first interface) of Taobao in the first display area.

In the solution described in steps 401A/401B to 410, when the first interface is the home page of the first application, the first display area is used to display only the home page of the first application and a page at a same level as the home page, and the second display area is used to display another interface of the first application. This can be convenient for the user to frequently perform operations on the home page and the page at the same level as the home page, without a need to frequently call the home page or the page at the same level as the home page to perform an operation.

For another example, after step 405 or step 408, the interface displayed by the tablet in the second display area is the interface at a level lower than the interface displayed in the first display area. In this way, the user can browse content of interfaces with two adjacent levels on the display screen. This is convenient for the user to make contrast and perform an operation between the content of the interfaces with the two adjacent levels. Specifically, after step 409, the method may further include the following steps.

411. If the fourth interface and the second interface correspond to a same level, in response to the fourth operation, the tablet displays the fourth interface in the second display area and keeps the interface displayed in the first display area unchanged.

For example, based on FIG. 11A, the first interface may be the home page 1101 of Taobao, the second interface may be the hat list interface 1102, the fourth operation may be an operation of the user for tapping a "Tmall" control on the interface 1102 in FIG. 11A, and the fourth interface may be a hat list interface of "Tmall". The tablet may display the hat list interface of "Tmall" in the second display area and still display the interface 1101 in the first display area.

412. If the fourth interface is an interface at a level lower than the second interface, in response to the fourth operation, the tablet displays the fourth interface in the second display area.

413. The tablet displays the second interface in the first display area in response to the fourth operation.

Figure 11C:
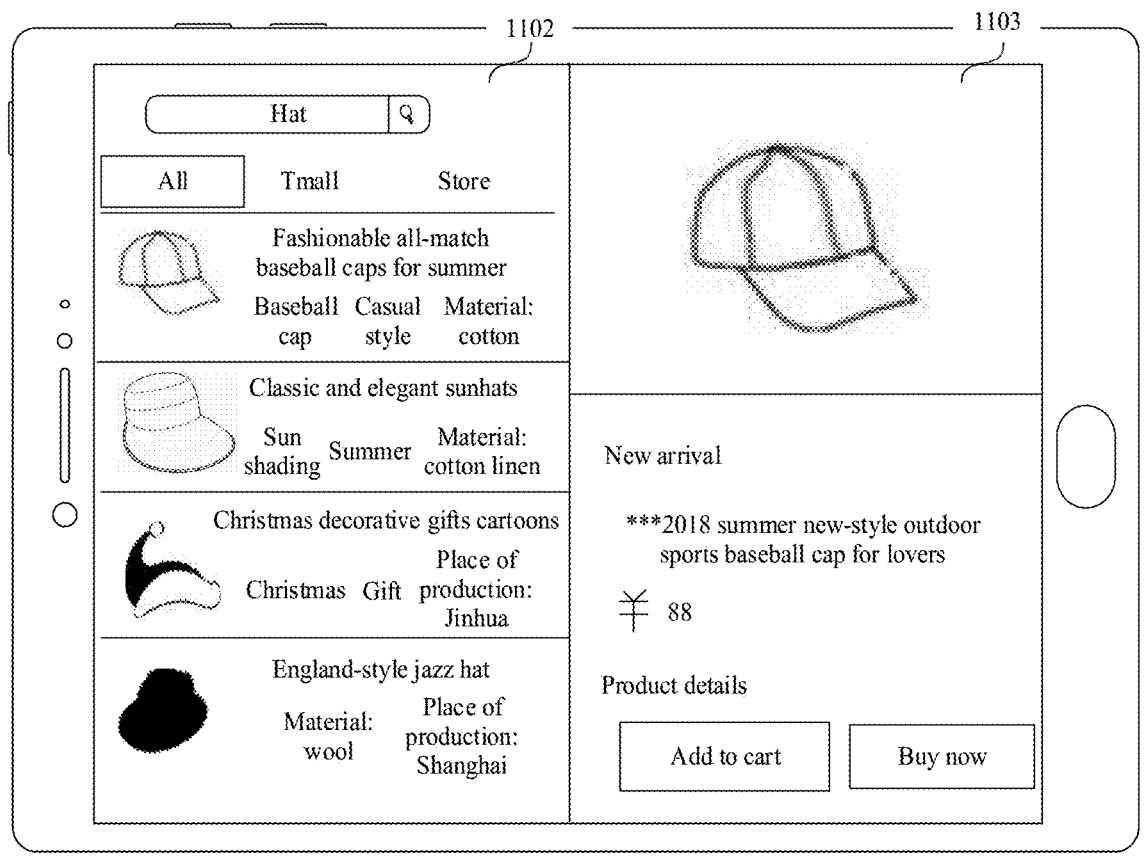
FIG. 11C is another schematic diagram of an interface of an electronic device according to an embodiment of this application.

For example, based on FIG. 11A, the first interface may be the home page 1101 of Taobao, the second interface may be the hat list interface 1102, the fourth operation may be an operation of the user for tapping a hat link on the interface 1102 in FIG. 11A, the fourth interface may be a detail page of the hat link, and the detail page of the hat link is an interface at a level lower than the hat list interface 1102. In this case, referring to FIG. 11C, the tablet may display a detail page 1103 (that is, the fourth interface) of the hat link in the second display area and update the home page 1101 (that is, the first interface) of Taobao in the first display area to the hat list interface 1102 (that is, the second interface). In this way, the user can simultaneously view pictures and links of various hats in the first display area and a picture and detailed information of one type of hat that are opened currently in the second display area. This is convenient for the user to compare materials, prices, places of production, and other characteristics of different hats, so that the user knows and purchases a hat conveniently.

For example, in this display manner, the first application may be a shopping type application, for example, Taobao, Amazon shopping, or JD shopping; or may be an application that may include interfaces with three or more levels (or a plurality of activities), or the like.

In some embodiments, the tablet stores a correspondence between different display solutions and applications. When the tablet starts an application, an interface corresponding to the application may be displayed based on a display manner corresponding to the tablet in the correspondence. For example, the display solution (referred to as a display solution 1) described in steps 401 to 410 may correspond to applications such as Toutiao, Sohu News, and Netease News. The display solution (referred to as a display solution 2) described in steps 401 to 407 and steps 411 to 413 corresponds to applications such as Taobao, Amazon shopping, and JD shopping. In some other embodiments, the user may alternatively proactively set a correspondence between applications and display solutions.

After step 405, step 408, step 410, or step 413 is performed, when the tablet detects a fifth operation that is performed by on the second interface and that is used to open a fifth interface of the first application, if the fifth interface is an interface at a level higher than the second interface, in response to the fifth operation, the tablet may perform one of the following display solutions.

The fifth interface is displayed in the second display area and the interface displayed in the first display area is unchanged. For example, based on FIG. 11B, the second interface in the second display area is the interface 1103, the interface in the first display area is the interface 1101, the fifth operation is an operation of the user for tapping a return control (for example, a back back key) on the interface 1103, and the fifth interface is the interface 1102. In response to the fifth operation, the tablet displays the interface 1102 in the second display area and still displays the interface 1101 in the first display area.

Alternatively, the tablet displays the fifth interface in the first display area and keeps the interface displayed in the second display area unchanged. For example, based on FIG. 11B, the second interface displayed in the second display area is the interface 1103, the interface displayed in the first display area is the interface 1101, the fifth operation is an operation of the user for tapping a return control on the interface 1103, and the fifth interface is the interface 1102. In response to the fifth operation, the tablet displays the interface 1102 in the first display area and still displays the interface 1103 in the second display area.

Alternatively, the tablet stops displaying the second interface in the second display area, where content displayed in the second display area is the desktop, that is, a part of the desktop background is presented in the second display area; and still displays the first interface in the first display area. For example, based on FIG. 11A, the second interface in the second display area is the interface 1102, the interface in the first display area is the interface 1101, the fifth operation is an operation of the user for tapping a return control on the interface 1103, and the fifth interface is the interface 1101. In response to the fifth operation, the tablet still displays the interface 1101 in the first display area, and displays the desktop in the second display area, that is, a part of the desktop background is presented in the second display area.

When the level relationship between interfaces is not considered, after step 405, the method may further include the following several display solutions.

(1) The tablet detects a sixth operation performed on the first interface, where the sixth operation is used to open a sixth interface of the first application. In response to the sixth operation, the tablet displays the sixth interface in the second display area and still displays the first interface in the first display area. In other words, the tablet always displays the first interface of the first application in the first display area, and displays, in the second display area, another interface that is of the first application and that is called by using the first interface. In this way, when the first interface is the home page of the first application, the home page can be kept being displayed in the first display area. This is convenient for the user to frequently perform operations on the home page.

For example, based on FIG. 5C, the first interface in the first display area is the interface 507, and the second interface in the second display area is the interface 509. If detecting an operation of the user for tapping the "hotspot" control on the interface 507, the tablet displays the "hotspot" information list interface in the second display area. If detecting an operation of the user for tapping a piece of information on the interface 507, the tablet displays detailed information linked to the piece of information in the second display area.

(2) The tablet detects a seventh operation performed in the first display area or the second display area, where the seventh operation is used to open a seventh interface of the first application. In response to the seventh operation, the tablet displays the sixth interface in the second display area and still displays the first interface in the first display area. In other words, the tablet always displays the first interface of the first application in the first display area, and displays, in the second display area, an interface that is of the first application and that is other than the first interface. In this way, when the first interface is the home page of the first application, the home page can be kept being displayed in the first display area. This is convenient for the user to frequently perform operations on the home page.

For example, based on FIG. 11A, the interface in the first display area may be the home page 1101 of Taobao, and the interface in the second display area may be the hat list interface 1102. If detecting an operation that is performed by the user on the interface 1101 in the first display area or the interface 1102 in the second display area and that is used to open another interface of the first application, the tablet displays the another interface in the second display area and keeps displaying the interface 1101 in the first display area.

(3) The tablet detects an eighth operation performed in the first display area, where the eighth operation is used to open an eighth interface of the first application; in this case, in response to the eighth operation, the tablet displays the eighth interface in the second display area and still displays the first interface in the first display area. The tablet detects a ninth operation performed in the second display area, where the ninth operation is used to open a ninth interface of the first application; in this case, in response to the ninth operation, the tablet displays the ninth interface in the first display area and still displays the second interface in the second display area. In other words, the tablet displays, in the second display area, another interface that is of the first application and that is called by using the interface in the first display area; and the tablet displays, in the first display area, another interface that is called by using the interface in the second display area. The tablet displays another interface that is called by using an interface in a display area, in another display area. This can be convenient for the user to contrast a calling interface and a called interface.

For example, based on FIG. 11A, the interface in the first display area may be the home page 1101 of Taobao, and the interface in the second display area may be the hat list interface 1102. If detecting an operation that is performed by the user on the interface 1101 in the first display area and that is used to open another interface of the first application, the tablet displays the another interface in the second display area and keeps displaying the interface 1101 in the first display area. If detecting an operation that is performed by the user on the interface 1102 in the second display area and that is used to open another interface of the first application, the tablet displays the another interface in the first display area and keeps displaying the interface 1102 in the second display area.

(4) The tablet detects an eighth operation performed in the first display area, where the eighth operation is used to open an eighth interface of the first application; in this case, in response to the eighth operation, the tablet displays the eighth interface in the first display area and still displays the second interface in the second display area. The tablet detects a ninth operation performed in the second display area, where the ninth operation is used to open a ninth interface of the first application; in this case, in response to the ninth operation, the tablet displays the ninth interface in the second display area and still displays the first interface in the first display area. In other words, the tablet displays, in the first display area, another interface that is of the first application and that is called by using the interface in the first display area; and the tablet displays, in the second display area, another interface that is called by using the interface in the second display area. The tablet still displays another interface that is called by using an interface in a display area, in the display area. In this way, interfaces that have a calling relationship are displayed in a same display area.

For example, based on FIG. 11A, the interface in the first display area may be the home page 1101 of Taobao, and the interface in the second display area may be the hat list interface 1102. If detecting an operation that is performed by the user on the interface 1101 in the first display area and that is used to open another interface of the first application, the tablet displays the another interface in the first display area and keeps displaying the interface 1102 in the second display area. If detecting an operation that is performed by the user on the interface 1102 in the second display area and that is used to open another interface of the first application, the tablet displays the another interface in the second display area and keeps displaying the interface 1101 in the first display area.

Further, after the tablet exits the first application and returns to the desktop, if the tablet detects an operation that is performed by the user on the desktop and that is used to indicate to open a second application, or if the tablet detects an operation of the user for starting a second application by using a voice instruction, the tablet may display an interface of the second application in a way in which the tablet displays an interface of the first application. For example, after the tablet displays an interface of the first application, if the tablet returns to the desktop and detects a touch operation that is performed by the user on the desktop and that is used to indicate to start the second application, the tablet displays an interface of the second application.

In some embodiments, in the solution described in steps 401 to 410, when detecting an operation that is performed by the user on an interface of the first application and that is used to indicate to start the second application, the tablet may display an interface of the second application in the second display area. For example, the first application is Toutiao, and the second application is WeChat. When the user indicates, on an interface of the Toutiao application, to perform sharing by using WeChat, the tablet detects an operation that is performed by the user on the interface of the Toutiao application and that is used to indicate to start WeChat, and then the tablet may display an interface of WeChat in the second display area and keep content displayed in the first display area unchanged. Afterwards, when the tablet exits an interface of the second application displayed in the second display area, the tablet may prompt the user to determine whether to make the tablet return to the first application or stay in the second application. If the user indicates the tablet to return to the first application, the tablet resumes displaying an interface of the first application (the interface of the first application that is displayed before an interface of the second application is displayed) in the second display area and keeps the content displayed in the first display area unchanged. If the user indicates the tablet to stay in the second application, the tablet does not display the interface of the first application any longer, but displays a home page of the second application in the first display area and displays another interface of the second application according to steps 404 to 413. Details are not described herein.

Figure 12:
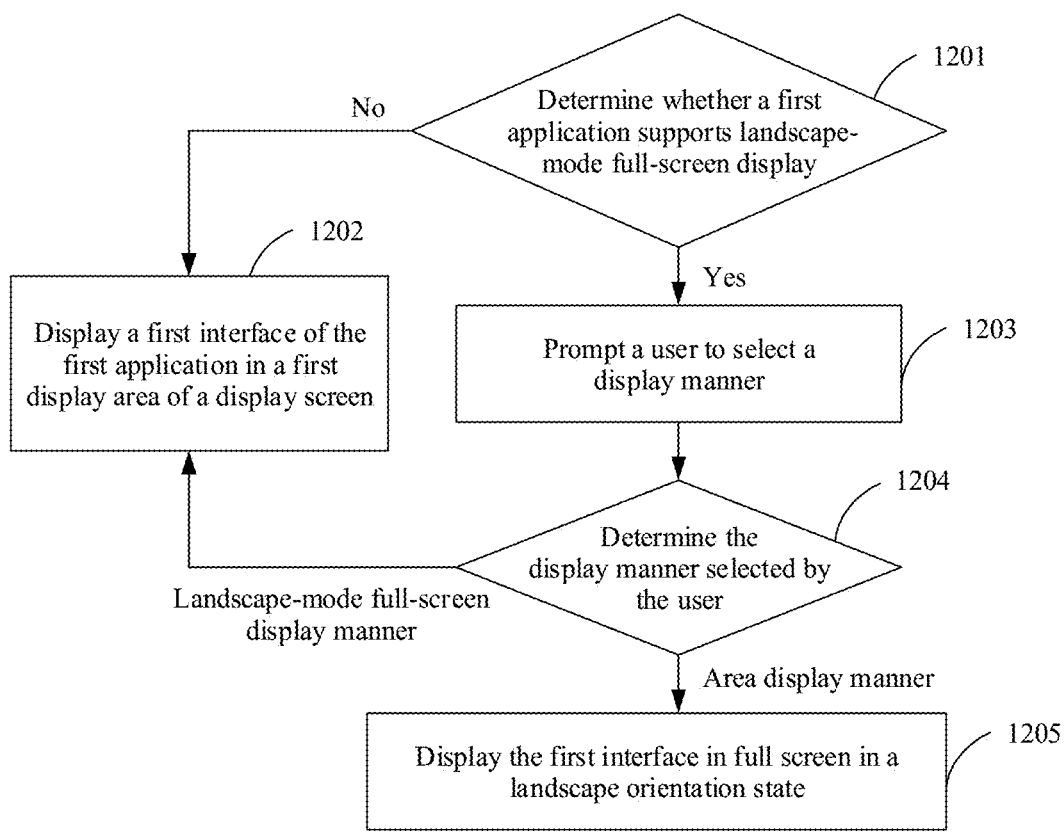
FIG. 12 is a flowchart of determining a display manner according to an embodiment of this application.

In some embodiments, the tablet may display the first interface in a display manner selected by the user. Specifically, referring to FIG. 12, step 403 may include the following steps:

1201. The tablet determines whether the first application supports landscape-mode full-screen display. If the first application does not support landscape-mode full-screen display, the tablet performs step 1202. If the first application supports landscape-mode full-screen display, the tablet performs step 1203.

1202. The tablet displays the first interface of the first application in the first display area of the display screen.

1203. The tablet prompts the user to select a display manner, where the display manner includes landscape-mode full-screen display and area display; and then performs step 1204.

1204. The tablet determines the display manner selected by the user. If detecting that the user chooses to use the area display manner, the tablet performs step 1202. If detecting that the user chooses to use the landscape-mode full-screen display manner, the tablet performs step 1205.

1205. The tablet displays the first interface in full screen in the landscape orientation state.

The area display manner is a manner in which the tablet displays an interface of an application in a display area of the display screen in the landscape orientation state and that is provided in this embodiment of this application. In other words, before displaying an interface of the first application, the tablet may first determine whether the first application supports landscape-mode full-screen display. If the first application does not support landscape-mode full-screen display, the tablet uses the area display method provided in this embodiment of this application, to display the first interface of the first application in the first display area and display another interface of the first application.

If the first application supports landscape-mode full-screen display, in one case, the tablet may consider, in default, displaying an interface of the first application in the landscape-mode full-screen display manner. In another case, the tablet may query whether the user uses the landscape-mode full-screen display manner or uses the area display manner provided in this embodiment of this application. If the user indicates to use the landscape-mode full-screen display manner, the tablet displays an interface of the first application in the landscape-mode full-screen display manner. If the user indicates to use the area display manner, the tablet displays an interface of the first application by using the display method provided in this embodiment of this application. For example, referring to FIG. 13, the tablet may use a prompt box 1301 to prompt the user to select a display manner. Alternatively, the user may set some whitelists, where applications in the whitelists use the area display manner when the tablet is in a landscape mode, or applications in the whitelists use the full-screen display manner when the tablet is in a landscape mode.

In some other embodiments, the tablet displays an interface of the first application in the area display manner in the landscape orientation state. After the tablet is switched from the landscape orientation state to the portrait orientation state, the tablet displays an interface of the first application in full screen in the portrait orientation state.

In this case, the interface of the first application displayed by the tablet in full screen in the portrait orientation state may be an interface that is most recently displayed by the tablet in a display area in the landscape orientation state. For example, based on FIG. 11A, the interface that is most recently displayed by the tablet in the display area in the landscape orientation state is the interface 1102. After the tablet is switched from the landscape orientation state to the portrait orientation state, the tablet may display the interface 1102 in full screen in the portrait orientation state.

Figure 14:
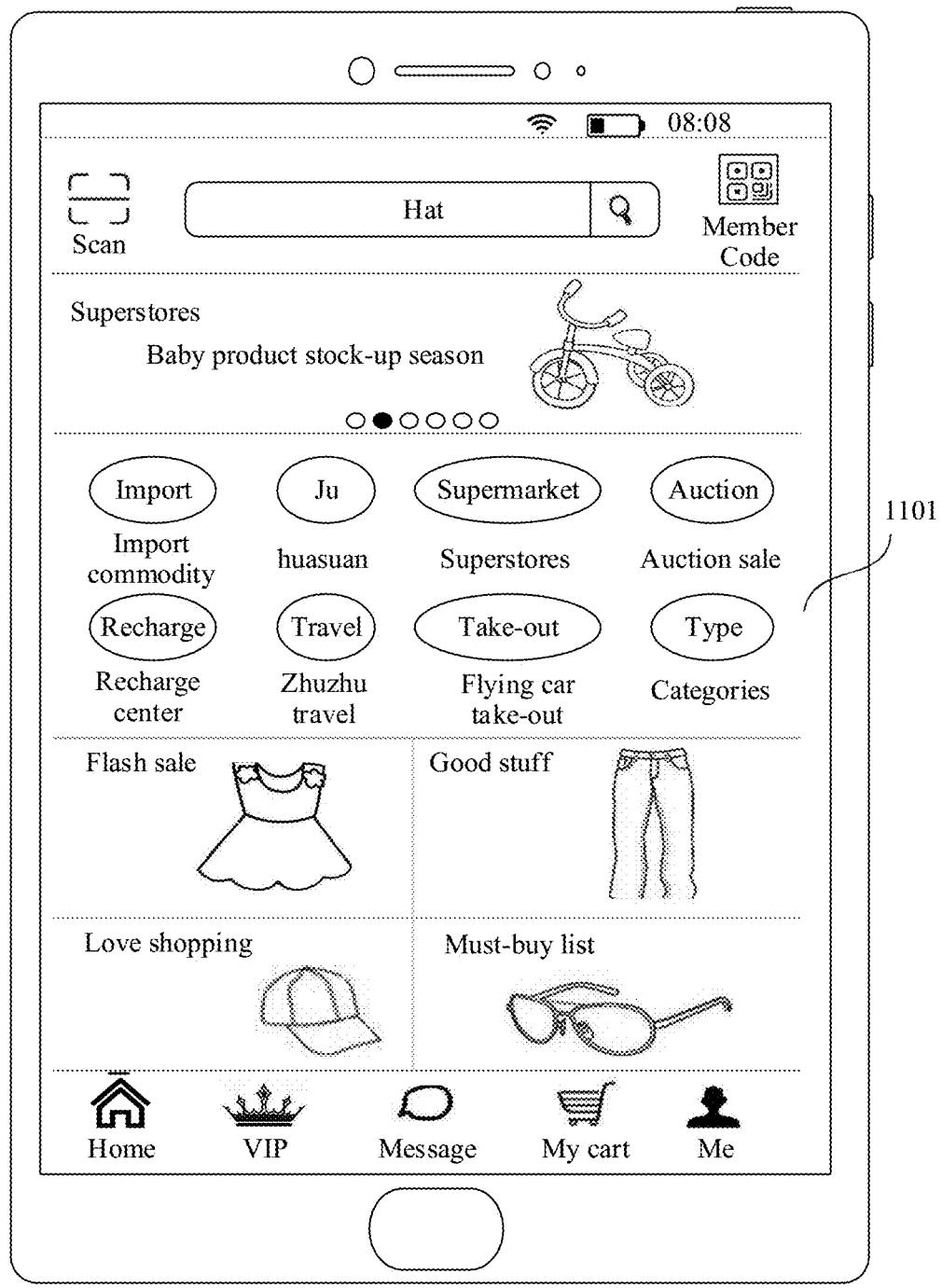
FIG. 14 is another schematic diagram of an interface of an electronic device according to an embodiment of this application.

Alternatively, the interface of the first application displayed by the tablet in full screen in the portrait orientation state may be an interface on which a user operation is most recently detected by the tablet in a display area in the landscape orientation state. For example, based on FIG. 11A, the interface on which the user operation is most recently detected by the tablet in the display area in the landscape orientation state is the interface 1101. After the tablet is switched from the landscape orientation state to the portrait orientation state, referring to FIG. 14, the tablet may display the interface 1101 in full screen in the portrait orientation state.

Alternatively, the interface of the first application displayed by the tablet in full screen in the portrait orientation state may be an interface that is most recently displayed by the tablet in a preset display area in the landscape orientation state. For example, the preset display area is the first display area, and based on FIG. 11A, the interface in the first display area is the interface 1101. After the tablet is switched from the landscape orientation state to the portrait orientation state, the tablet may display the interface 1101 in full screen in the portrait orientation state.

In the portrait orientation state, an absolute value of a difference between the aspect ratio of the display screen of the tablet and the preset ratio is usually less than or equal to the preset value 2, that is, the aspect ratio of the display screen of the tablet differs slightly from the preset ratio. Therefore, the tablet can normally display an interface of an application in the portrait orientation state. After the tablet displays an interface of the first application in the landscape orientation state, if the tablet is switched to the portrait orientation state, the tablet normally displays the interface of the first application in the portrait orientation state (in a portrait-mode full-screen display manner). In addition, when detecting an operation of the user for opening another interface, the tablet normally displays the another interface in the portrait orientation state. In other words, the tablet can normally display an interface of an application both in the portrait orientation state and the landscape orientation state.

The foregoing uses examples for description in which the display screen of the tablet includes two display areas in the landscape orientation state. In some other embodiments, the display screen of the tablet may alternatively include one display area or at least two display areas in the landscape orientation state.

Figure 15:
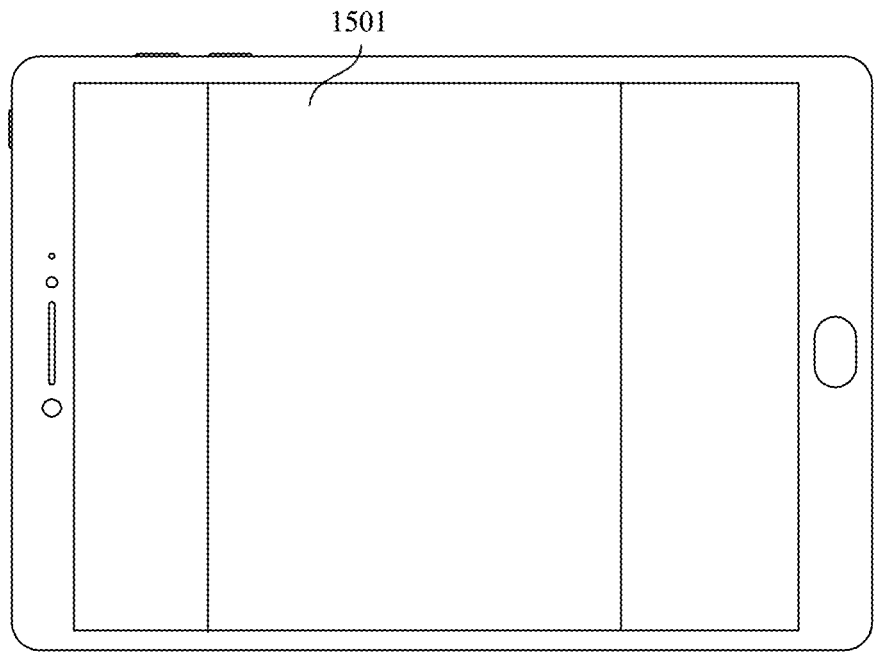
FIG. 15 is a schematic diagram illustrating division of display areas according to an embodiment of this application.

For example, referring to FIG. 15, in the landscape orientation state, the display screen of the tablet includes a display area 1501, and an absolute value of a difference between an aspect ratio of the display area and the preset ratio is less than or equal to the preset value 2, that is, the aspect ratio of the display area differs slightly from the preset ratio. When displaying an interface of an application, the tablet can normally display the interface of an application in the display area of the display screen.

Figure 13:
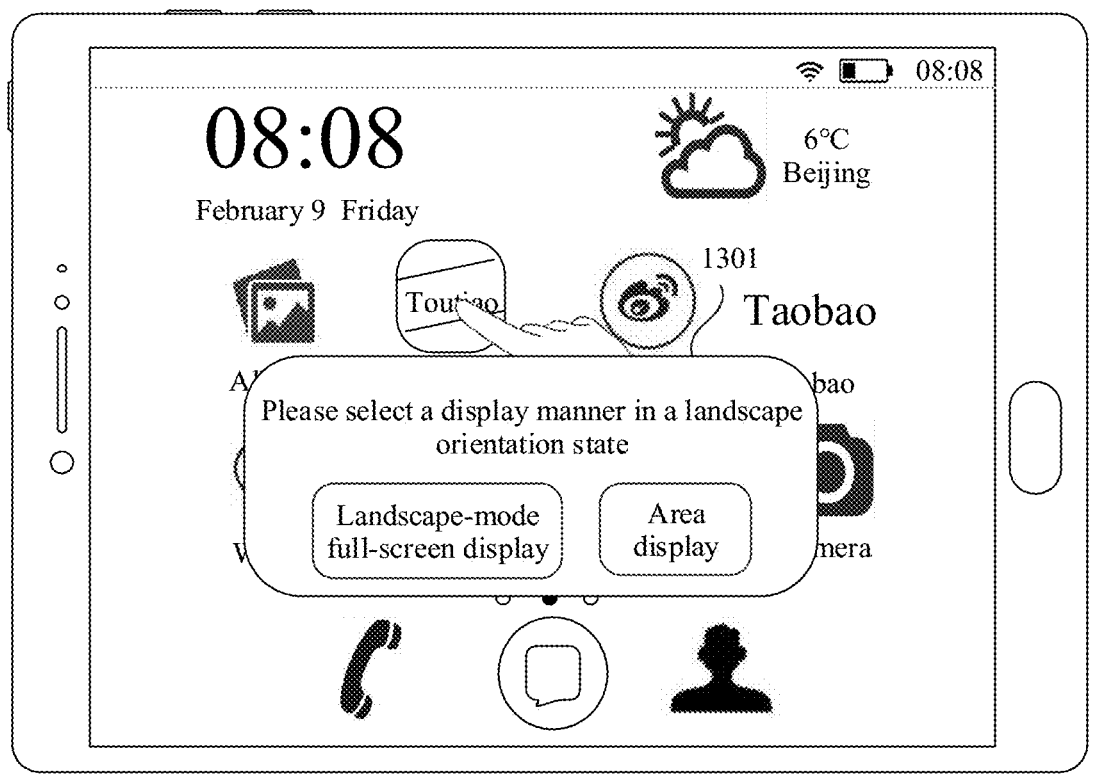
FIG. 13 is another schematic diagram of an interface of an electronic device according to an embodiment of this application.

In some embodiments, in the landscape orientation state, when displaying the first interface of the first application, the tablet includes the display area 1501 shown in FIG. 13, and the tablet displays the first interface in the display area 1501. When the tablet continues displaying another interface of the first application, the display screen includes the display area 601 and the display area 602 shown in FIG. 6, the tablet displays the first interface of the first application in the first display area 601, and displays the another interface of the first application in the display area 601 and the display area 602 by using the display method described in the foregoing embodiment.

Figure 16:
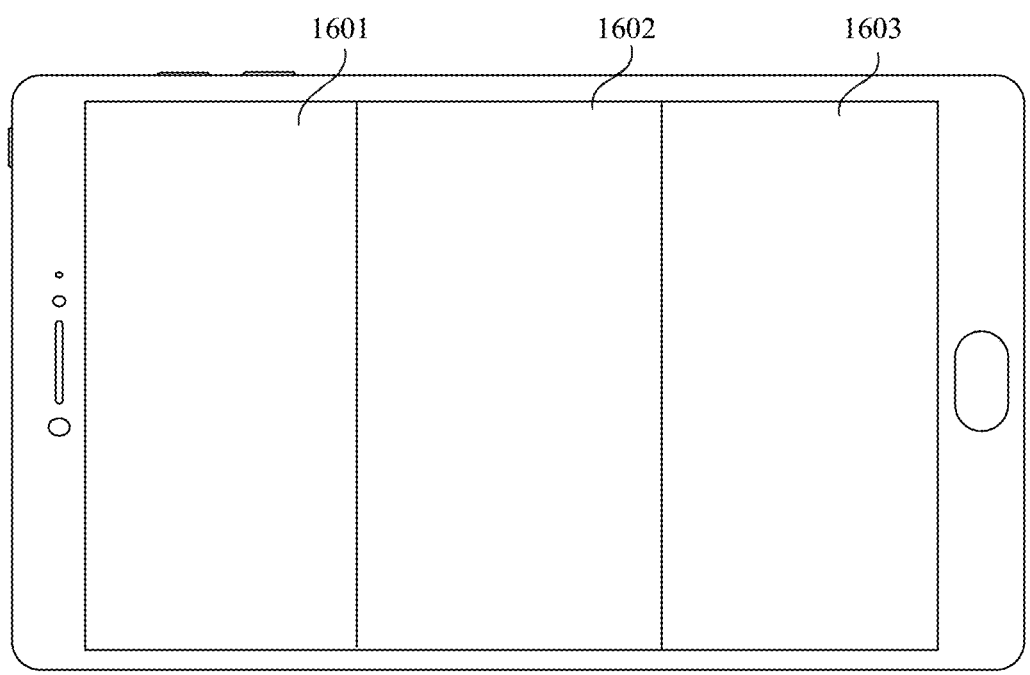
FIG. 16 is a schematic diagram illustrating other division of display areas according to an embodiment of this application.

For another example, referring to FIG. 16, in the landscape orientation state, the display screen of the tablet includes three display areas: a display area 1601, a display area 1602, and a display area 1603. The tablet may display different interfaces of an application in the three display areas. For example, if a user operation requests to open a new interface that corresponds to a same level as an interface in a current display area, the new interface is displayed in the current display area. If a user operation requests to open a new interface at a level higher than an interface in a current display area, the new interface is displayed in a display area on the left of the current display area; and if there is no display area on the left of the current display area, the new interface is displayed in the current display area. If a user operation requests to open a new interface at a level lower than an interface in a current display area, the new interface is displayed in a display area on the right of the current display area; and if there is no display area on the right of the current display area, the new interface is displayed in the current display area.

It can be understood that, to implement the foregoing functions, the electronic device includes corresponding hardware and/or software modules for performing the functions. With reference to algorithm steps described in the embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of the embodiments of this application.

In this embodiment, function modules of the electronic device may be obtained through division based on the foregoing method example. For example, each function module may be obtained through division in correspondence to each function, or at least two functions may be integrated into one processing module. The integrated module may be implemented by using hardware. It should be noted that, in this embodiment, module division is used as an example, and is merely a logical function division. In actual implementation, another division manner may be used.

Figure 17:
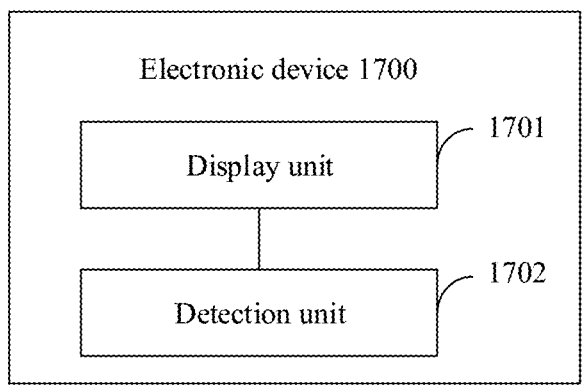
FIG. 17 is a schematic structural diagram of an electronic device according to an embodiment of this application.

When each function module is obtained through division in correspondence to each function, FIG. 17 is a possible schematic composition diagram of an electronic device 1700 in the foregoing embodiments. As shown in FIG. 17, the electronic device 1700 may include a display unit 1701 and a detection unit 1702.

The display unit 1701 may be configured to: support the electronic device 1700 in performing step 401A, step 401B, step 403, step 405, step 407, step 408, step 410, step 411, step 412, step 413, and the like, and/or perform other processes in the technologies described in this specification.

A processing unit 1702 may be configured to: support the electronic device 1700 in performing step 402, step 404, step 406, step 409, and the like, and/or perform other processes in the technologies described in this specification.

It should be noted that all related content of various steps in the foregoing method embodiment may be cited in function descriptions of a corresponding function module. Details are not described herein again.

The electronic device 1700 provided in this embodiment is configured to perform the application display method, and therefore can achieve a same effect as the foregoing implementation method.

When the integrated unit is used, the electronic device 1700 may include a processing module, a storage module, and a communications module. The processing module may be configured to control and manage actions of the electronic device 1700. For example, the processing module may be configured to support the electronic device 1700 in performing steps performed by the display unit 1701 and the detection unit 1702. The storage module may be configured to support the electronic device 1700 in storing program code, data, and the like. The communications module may be configured to support the electronic device 1700 in communicating with another device.

The processing module 81 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processing (digital signal processing, DSP) and a microprocessor. The storage module may be a memory. The communications module may be specifically a radio frequency circuit, a Bluetooth chip, a Wi-Fi chip, or a device that interacts with another electronic device.

In an embodiment, when the processing module is a processor and the storage module is a memory, the electronic device in this embodiment may be a device that is of the structure shown in FIG. 2A.

An embodiment of this application further provides a computer storage medium. The computer storage medium stores a computer instruction. When the computer instruction is run on an electronic device, the electronic device is enabled to perform the foregoing related method steps to implement the application display method in the foregoing embodiment.

An embodiment of this application further provides a computer program product. When the computer program product is run on a computer, the computer is enabled to perform the foregoing related steps to implement the application display method performed by the electronic device in the foregoing embodiment.

In addition, an embodiment of this application further provides an apparatus. The apparatus may be specifically a chip, a component, or a module, and the apparatus may include a processor and a memory that are connected to each other. The memory is configured to store a computer executable instruction. When the apparatus runs, the processor can execute the computer executable instruction stored in the memory, so that the chip performs the application display method performed by the electronic device in the method embodiment.

Any one of the electronic device, the computer storage medium, the computer program product, or the chip provided in the embodiments is configured to perform the corresponding method provided above. Therefore, for beneficial effects thereof, refer to the beneficial effects of the corresponding method provided above. Details are not described herein again.

The foregoing descriptions about implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. An electronic device, comprising:
a display screen;
a memory configured to store one or more programs; and
one or more processors coupled to the display screen and the memory, wherein the one or more processors are configured to execute the one or more programs to cause the electronic device to:
   detect a first operation;
   display, in response to the first operation, a first interface of a first application in the display screen, wherein the first interface corresponds to a first activity;
   detect, on the first interface, a second operation to open a second interface of the first application, wherein the second interface corresponds to a second activity, and wherein the first activity and the second activity are different;
   display, in response to the second operation, the second interface in a second area while displaying the first interface in a first area, wherein the display screen comprises at least two areas, wherein the at least two areas comprise the first area and the second area, and wherein the first area and the second area do not overlap;
   detect, on the second interface, a third operation to open a third interface of the first application, wherein the third operation is a tap gesture, and wherein the third interface corresponds to a third activity;
   display, in response to detecting the third operation and in response to the third activity of the third interface being the same as the second activity of the second interface, the third interface in the second area while displaying the first interface in the first area; and
   simultaneously and directly display, in response to detecting the third operation and in response to the third activity of the third interface being different from the second activity of the second interface, the third interface in the second area and the second interface in the first area instead of displaying the second interface in the second area, wherein the third activity being different from the second activity comprises a level of the third interface being lower than a level of the second interface, and wherein each of the first operation, the second operation, and the third operation is a single gesture.

2. The electronic device of claim 1, wherein after simultaneously and directly displaying the third interface in the second area and the second interface in the first area, the one or more processors are further configured to execute the one or more programs to cause the electronic device to:
   detect, on the third interface in the second area, a second return operation; and
   simultaneously and directly display, in response to the second return operation, the second interface in the second area and the first interface in the first area.

3. The electronic device of claim 1, wherein the first operation is for starting the first application.

4. The electronic device of claim 1, wherein the first area is located on a left side of the display screen, and wherein the second area is located on a right side of the display screen.

5. The electronic device of claim 1, wherein each of the first area and the second area is a vertical bar-shaped area.

6. The electronic device of claim 1, wherein the one or more processors are further configured to execute the one or more programs to cause the electronic device to:
   display, in response to the first operation, the first interface in a third area of the display screen; and
   display, in response to the second operation, the second interface in the second area and the first interface in the first area.

7. The electronic device of claim 1, wherein a first display height of the first interface displayed in the first area is the same as a second display height of the second interface displayed in the second area.

8. The electronic device of claim 1, wherein the second interface is a detail page corresponding to a link operated by the second operation.

9. The electronic device of claim 1, wherein first two interfaces of the first application correspond to a same level when the first two interfaces correspond to a same activity, or wherein second two interfaces of the first application correspond to different levels when the second two interfaces correspond to different activities.

10. The electronic device of claim 1, wherein before detecting the first operation, the one or more processors are further configured to execute the one or more programs to cause the electronic device to display the first interface in a full screen in a portrait orientation state, and wherein the first operation enables the electronic device to switch from the portrait orientation state to a landscape orientation state.

11. The electronic device of claim 1, wherein the one or more processors are further configured to execute the one or more programs to cause the electronic device to display an advertising page of the first application before displaying the first interface.

12. The electronic device of claim 1, wherein the second operation is a first tap operation on first content of the first interface, or wherein the third operation is a second tap operation on third content of the second interface.

13. The electronic device of claim 1, wherein the tap gesture is a single tap gesture or a double tap gesture.

14. The electronic device of claim 1, wherein the tap gesture is on a content area displayed in the second area, and wherein the third interface comprises additional content associated with the content area.

15. The electronic device of claim 1, wherein after simultaneously and directly displaying the third interface in the second area and the second interface in the first area, the one or more processors are further configured to execute the one or more programs to cause the electronic device to:
   detect, on the second interface, either a fourth operation to open a fourth interface of the first application or a fifth operation to open a fifth interface of the first application, wherein the fourth interface corresponds to a fourth activity, wherein the fifth interface corresponds to a fifth activity, wherein the second activity and the fourth activity are the same, and wherein the second activity and the fifth activity are different;
   display, in response to detecting the fourth operation, the fourth interface in the first area while displaying the third interface in the second area; and display, in response to detecting the fifth operation, the fifth interface in the second area while displaying the second interface in the first area.

16. The electronic device of claim 15, wherein after displaying the fourth interface in the first area while displaying the third interface in the second area, the one or more processors are further configured to execute the one or more programs to cause the electronic device to:
   detect, on the fourth interface, a first return operation; and
   display, in response to the first return operation, the second interface in the first area.

17. The electronic device of claim 1, wherein the one or more processors are further configured to execute the one or more programs to cause the electronic device to:
   close the first application;
   open a second application;
   detect a fourth operation;
   display, in response to the fourth operation, a fourth interface of the second application in the display screen, wherein the fourth interface corresponds to a fourth activity;
   detect, on the fourth interface, a fifth operation to open a fifth interface of the second application, wherein the fifth interface corresponds to a fifth activity, and wherein the fourth activity and the fifth activity are different;
   display, in response to the fifth operation, the fifth interface in the second area while displaying the fourth interface in the first area;
   detect, on the fifth interface, a sixth operation to open a sixth twelfth interface of the second application, wherein the sixth interface corresponds to a sixth activity; and
   display, in response to the sixth operation, the sixth interface in the second area while displaying the fourth interface in the first area, wherein the fifth activity and the sixth activity are the same or different,
   wherein each of the fourth operation, the fifth operation, and the sixth operation is a single gesture.

18. The electronic device of claim 17, wherein the one or more processors are further configured to execute the one or more programs to cause the electronic device to:
   detect, on the fourth interface, a seventh operation to open a seventh interface of the second application, wherein the seventh interface corresponds to a seventh activity;
   display, in response to the seventh operation, the seventh interface in the first area while displaying the sixth interface in the second area; and
   display, in response to the seventh operation, the seventh interface in the second area while displaying the seventh interface in the first area, wherein the seventh operation is a single gesture.

19. The electronic device of claim 1, wherein the one or more processors are further configured to execute the one or more programs to cause the electronic device to display, in response to the first operation, the first interface in a landscape orientation state.

20. The electronic device of claim 19, wherein, in the landscape orientation state, each included angle between long sides of the display screen and a horizontal plane is less than or equal to a preset value.

21. The electronic device of claim 19, wherein the one or more processors are further configured to execute the one or more programs to cause the electronic device to:
   when the first application does not support a landscape-mode full-screen display, display the first interface in the first area; and
   when the first application supports the landscape-mode full-screen display:
      prompt a user to select a display manner, wherein the display manner comprises a landscape-mode full-screen display manner or an area display manner; and
      display, in response to the area display manner being selected by the user, the first interface in the first area and in the display manner.

22. The electronic device of claim 19, wherein the one or more processors are further configured to execute the one or more programs to cause the electronic device to display a fourth interface of the first application in a full screen in a portrait orientation state when the electronic device switches to the portrait orientation state, and wherein, in the portrait orientation state, each included angle between long sides of the display screen and a horizontal plane is greater than a preset value.

23. The electronic device of claim 22, wherein the fourth interface is one of:
   a fifth interface that is most recently displayed by the electronic device in the landscape orientation state;
   a sixth interface on which a user operation is most recently detected by the electronic device in the landscape orientation state; or
   a seventh interface that is most recently displayed by the electronic device in a preset area in the landscape orientation state.

24. A computer program product comprising instructions stored on a non-transitory computer-readable medium that, when executed by one or more processors, cause an electronic device to:
   detect a first operation;
   display, in response to the first operation, a first interface of a first application in a display screen of the electronic device, wherein the first interface corresponds to a first activity;
   detect, on the first interface, a second operation to open a second interface of the first application, wherein the second interface corresponds to a second activity, and wherein the first activity and the second activity are different;
   display, in response to the second operation, the second interface in a second area while displaying the first interface in a first area, wherein the display screen comprises at least two areas comprising the first area and the second area, and wherein the first area and the second area do not overlap;
   detect, on the second interface, a third operation to open a third interface of the first application, wherein the third operation is a tap gesture, and wherein the third interface corresponds to a third activity;
   display, in response to detecting the third operation and in response to the third activity of the third interface being the same as the second activity of the second interface, the third interface in the second area while displaying the first interface in the first area; and
   simultaneously and directly display, in response to detecting the third operation and in response to the third activity of the third interface being different from the second activity of the second interface, the third interface in the second area and the second interface in the first area instead of displaying the second interface in the second area, wherein the third activity being different from the second activity comprises a level of the third interface being lower than a level of the second interface, and wherein each of the first operation, the second operation, and the third operation is a single gesture.

25. The computer program product of claim 24, wherein when executed by one or more processors, further cause the electronic device to:

close the first application;

open a second application;

detect a fourth operation;

display, in response to the fourth operation, a fourth interface of the second application in the display screen, wherein the fourth interface corresponds to a fourth activity;

detect, on the fourth interface, a fifth operation to open a fifth interface of the second application, wherein the fifth interface corresponds to a fifth activity, and wherein the fourth activity and the fifth activity are different;

display, in response to the fifth operation, the fifth interface in the second area while displaying the fourth interface in the first area;

detect, on the fifth interface, a sixth operation to open a sixth interface of the second application, wherein the sixth interface corresponds to a sixth activity; and display, in response to the sixth operation, the sixth interface in the second area while displaying the fourth interface in the first area, wherein the fifth activity and the sixth activity are the same or different, wherein each of the fourth operation, the fifth operation, and the sixth operation is a single gesture.

26. An application display method implemented by an electronic device, wherein the application display method comprises:

detecting a first operation;

displaying, in response to the first operation, a first interface of a first application in a display screen of the electronic device, wherein the first interface corresponds to a first activity;

detecting, on the first interface, a second operation to open a second interface of the first application, wherein the second interface corresponds to a second activity, and wherein the first activity and the second activity are different;

displaying, in response to the second operation, the second interface in a second area while displaying the first interface in a first area, wherein the display screen comprises at least two areas comprising the first area and the second area, and wherein the first area and the second area do not overlap;

detecting, on the second interface, a third operation to open a third interface of the first application, wherein the third operation is a tap gesture, and wherein the third interface corresponds to a third activity;

displaying, in response to detecting the third operation and in response to the third activity of the third interface being the same as the second activity of the second interface, the third interface in the second area while displaying the first interface in the first area; and simultaneously and directly displaying, in response to detecting the third operation and in response to the third activity of the third interface being different from the second activity of the second interface, the third interface in the second area and the second interface in the first area instead of displaying the second interface in the second area, wherein the third activity being different from the second activity comprises a level of the third interface being lower than a level of the second interface, and wherein each of the first operation, the second operation, and the third operation is a single gesture.

* * * * *

UNITED STATES PATENT AND TRADEMARK OFFICE
CERTIFICATE OF CORRECTION

PATENT NO. : 12,468,430 B2
APPLICATION NO. : 17/985442
DATED : November 11, 2025
INVENTOR(S) : Xiuping Jiang, Jie Fang and Bo Wang Page 1 of 1

It is certified that error appears in the above-identified patent and that said Letters Patent is hereby corrected as shown below:

In the Claims

Claim 17, Column 41, Line 31: "sixth twelfth interface" should read "sixth interface"

Signed and Sealed this
Sixteenth Day of December, 2025

John A. Squires
*Director of the United States Patent and Trademark Office*